US008260199B2

(12) United States Patent
Kowalski

(10) Patent No.: US 8,260,199 B2
(45) Date of Patent: Sep. 4, 2012

(54) NFC MODULE, IN PARTICULAR FOR MOBILE PHONE

(76) Inventor: Jacek Kowalski, Aix en Provence (FR)

( * ) Notice: Subject to any disclaimer, the term of this patent is extended or adjusted under 35 U.S.C. 154(b) by 640 days.

(21) Appl. No.: 11/750,780

(22) Filed: May 18, 2007

(65) Prior Publication Data

US 2008/0245851 A1 Oct. 9, 2008

(30) Foreign Application Priority Data

Apr. 4, 2007 (FR) ...................... 07 02459

(51) Int. Cl.
H04B 5/00 (2006.01)
(52) U.S. Cl. . 455/41.1; 455/41.2; 455/558; 235/462.25; 235/462.45
(58) Field of Classification Search .................. 455/41.1, 455/424, 425, 456.5, 456.6, 561, 550.1, 575.1, 455/415, 412.1, 558, 557, 575.6, 434, 41.2; 340/853.9, 854.8, 854.6, 855.1, 870.15, 870.03, 340/870.11; 325/472, 462, 383; 370/252, 370/338; 235/462.25, 462.45, 462.49, 472.02, 235/472.03
See application file for complete search history.

(56) References Cited

U.S. PATENT DOCUMENTS

| | | | |
|---|---|---|---|
| 6,873,259 B2 * | 3/2005 | Teraura | 340/572.1 |
| 7,699,231 B2 * | 4/2010 | Yamaguchi | 235/492 |
| 7,796,949 B2 * | 9/2010 | Matsushita et al. | 455/63.1 |
| 2006/0074813 A1 * | 4/2006 | Saunders | 705/67 |
| 2006/0280149 A1 * | 12/2006 | Kuhl et al. | 370/338 |
| 2007/0115125 A1 * | 5/2007 | Lyon et al. | 340/572.1 |
| 2008/0181252 A1 * | 7/2008 | Rofougaran | 370/451 |

FOREIGN PATENT DOCUMENTS

EP 0296092 A2 * 12/1988
JP 10-228523 * 8/1998

OTHER PUBLICATIONS

Website: http://www.morerfid.com/details.php?subdetail=Report&action=details&report_id=2895, article entitled "Tracient and Narian Technologies Introduced a New NFC Enabler" dated Apr. 18, 2007 (1 pg.).
Website: http://www.morerfid.com/details.php?subdetail=Report&action=details&report_id=2906, article entitled "Innovision publishes highly anticipated third White Paper: 'NFC in the real world—Moving to System on Chip Integration' at WIMA 2007" dated Apr. 20, 2007 (2 pgs.).
Press Release from Narian Technologies/Tracient, dated Apr. 17, 2007 (2 pgs.).

* cited by examiner

*Primary Examiner* — Duc Nguyen
*Assistant Examiner* — Charles Chow
(74) *Attorney, Agent, or Firm* — Panitch Schwarze Belisario & Nadel LLP

(57) ABSTRACT

One embodiment of the invention comprises a functional module for storing and exchanging data, comprising a common portable support, at least one passive contactless integrated circuit in the form of a first semi-conductor chip, a contactless integrated circuit reader in the form of a second semi-conductor chip, the contactless integrated circuit and the reader being gathered on or in the common portable support, an antenna coil of the contactless integrated circuit, connected to the contactless integrated circuit, an antenna coil of the reader, connected to the reader, the antenna coil of the contactless integrated circuit being coupled to the antenna coil of the reader.

34 Claims, 17 Drawing Sheets

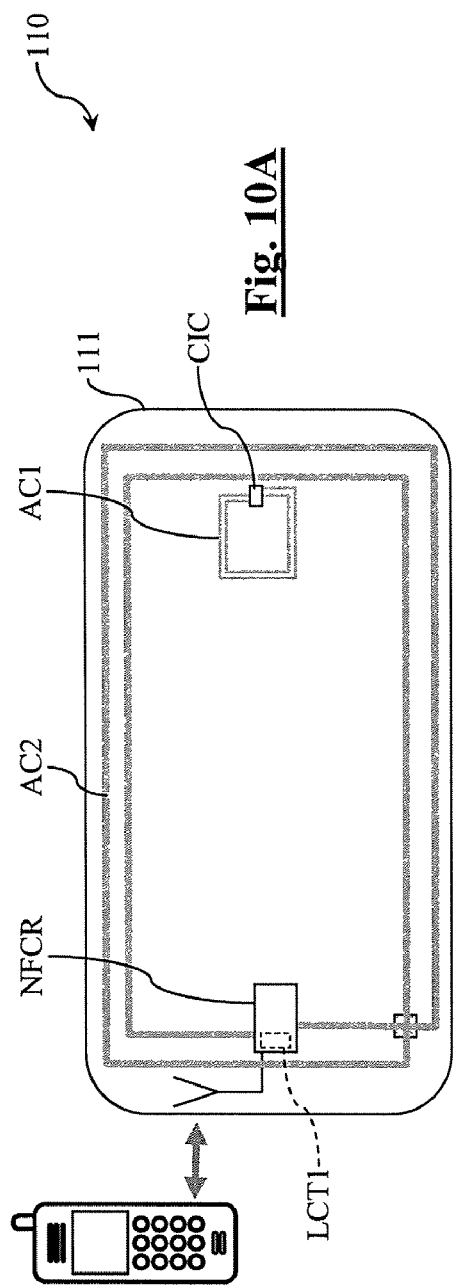
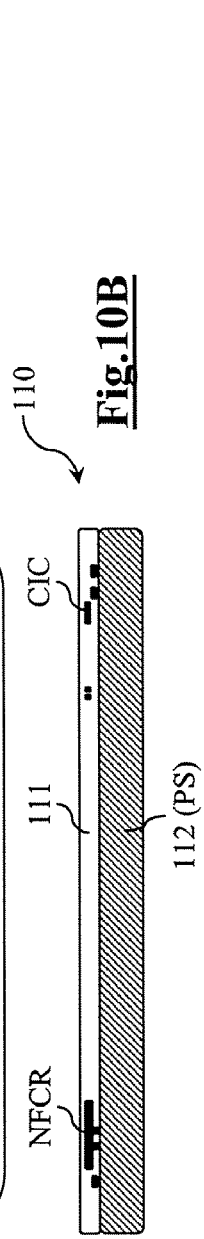
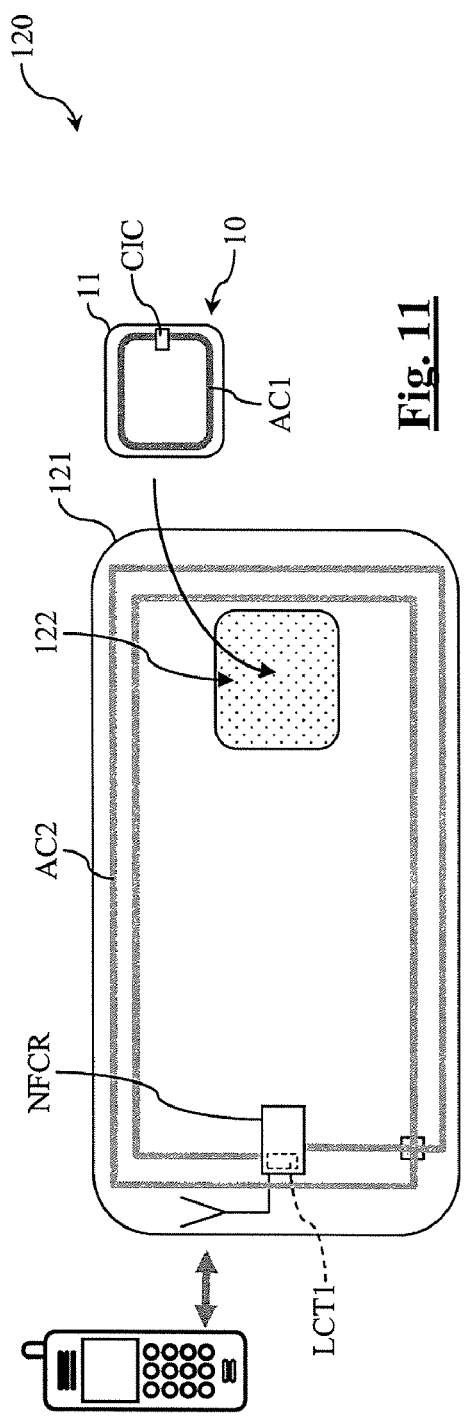

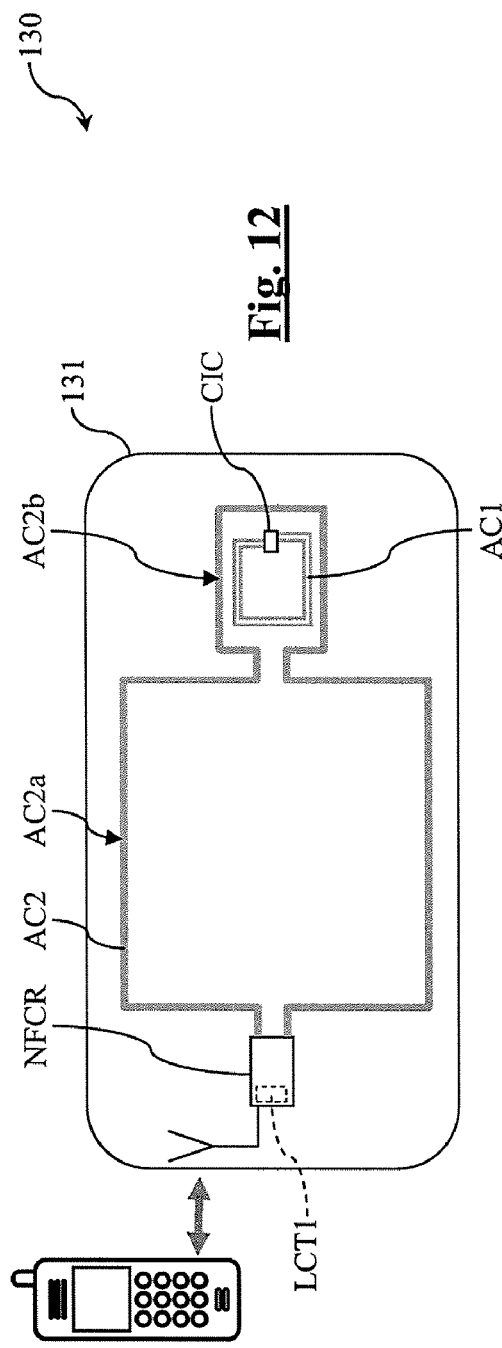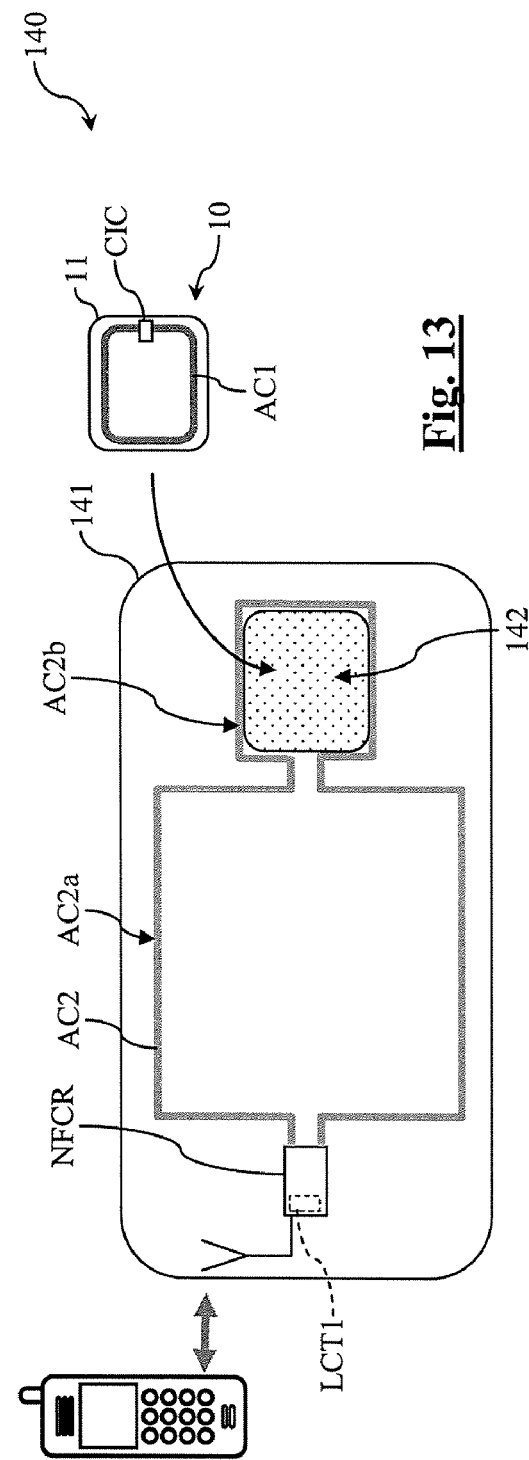

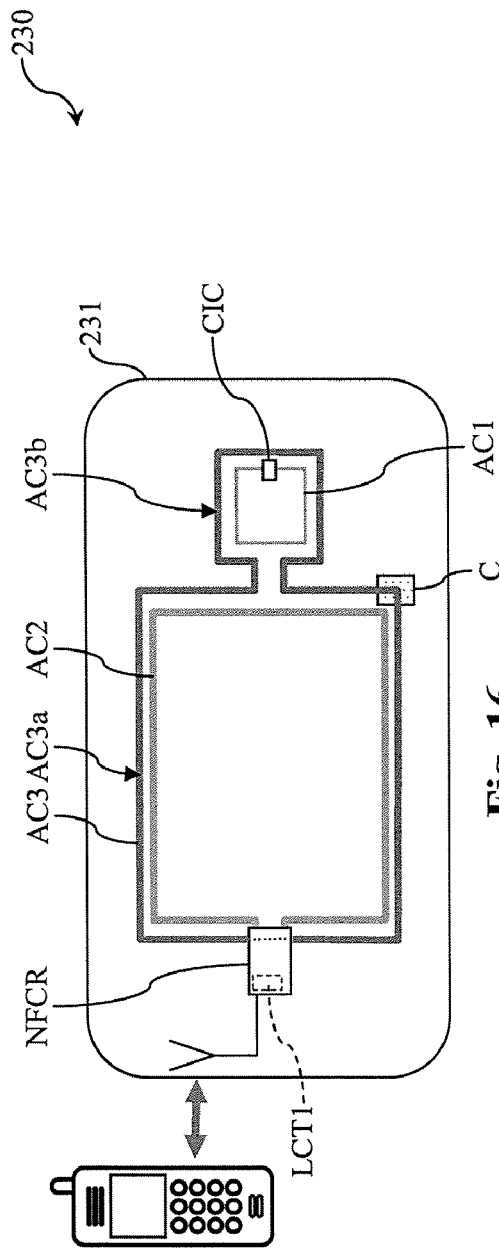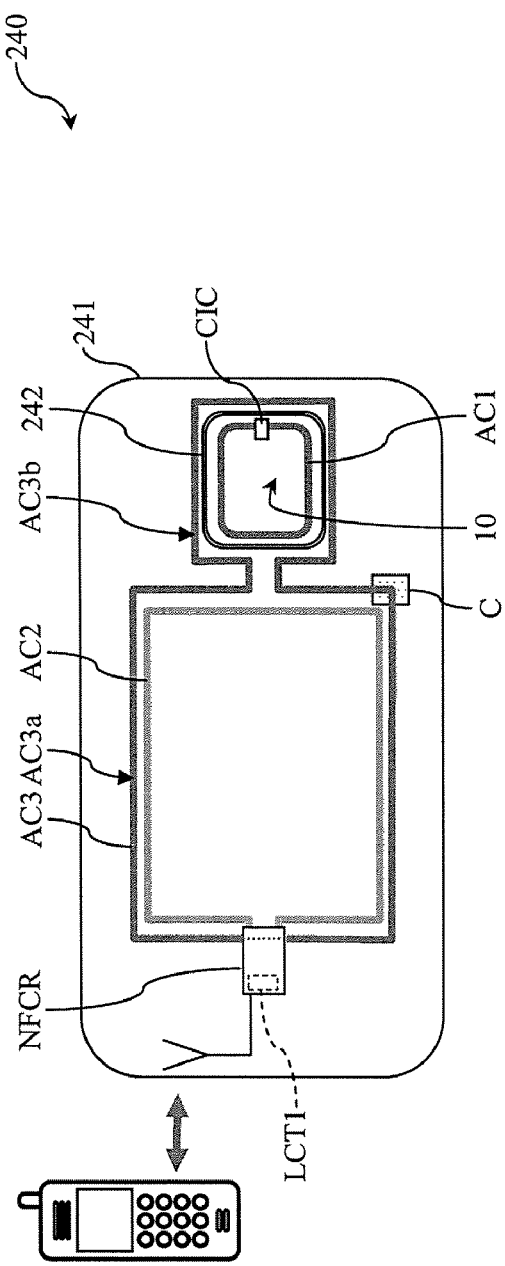

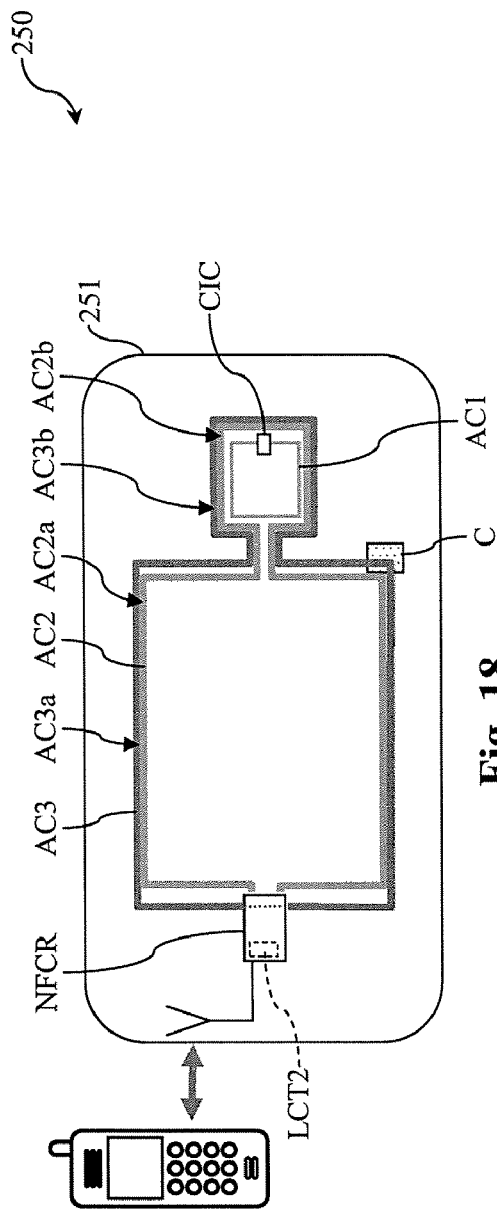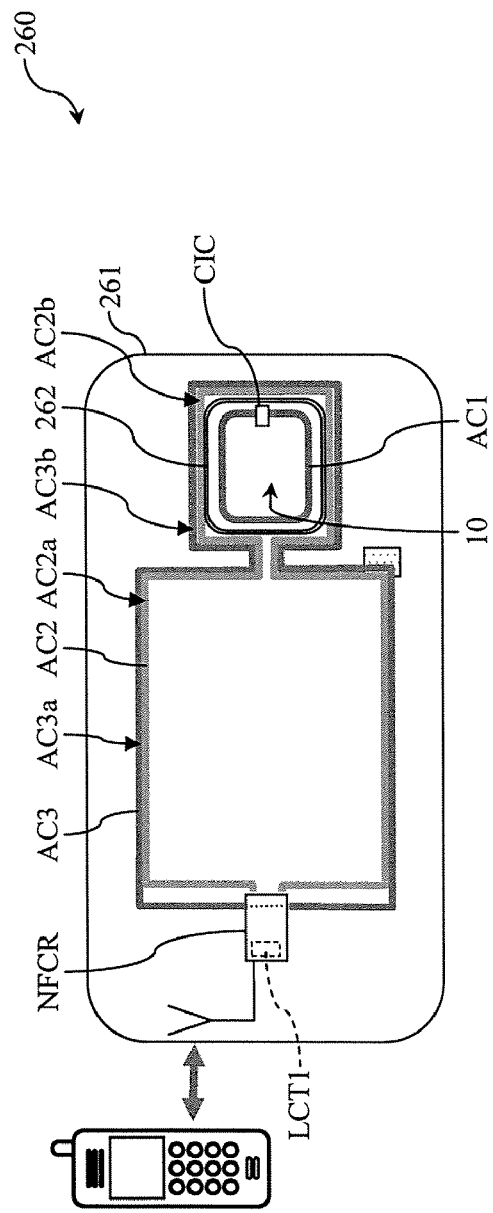

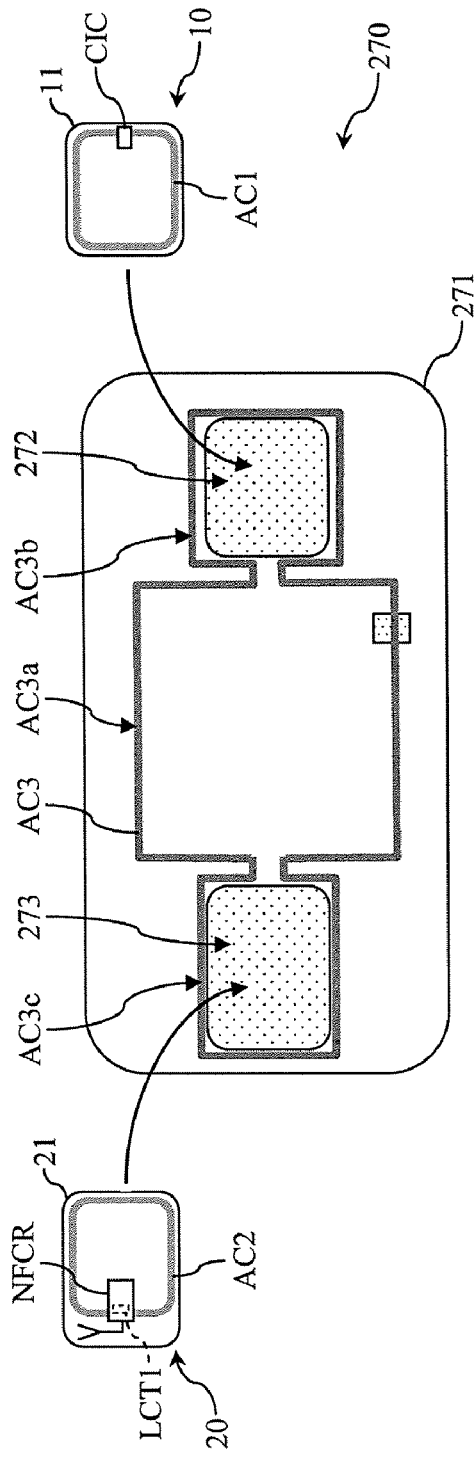
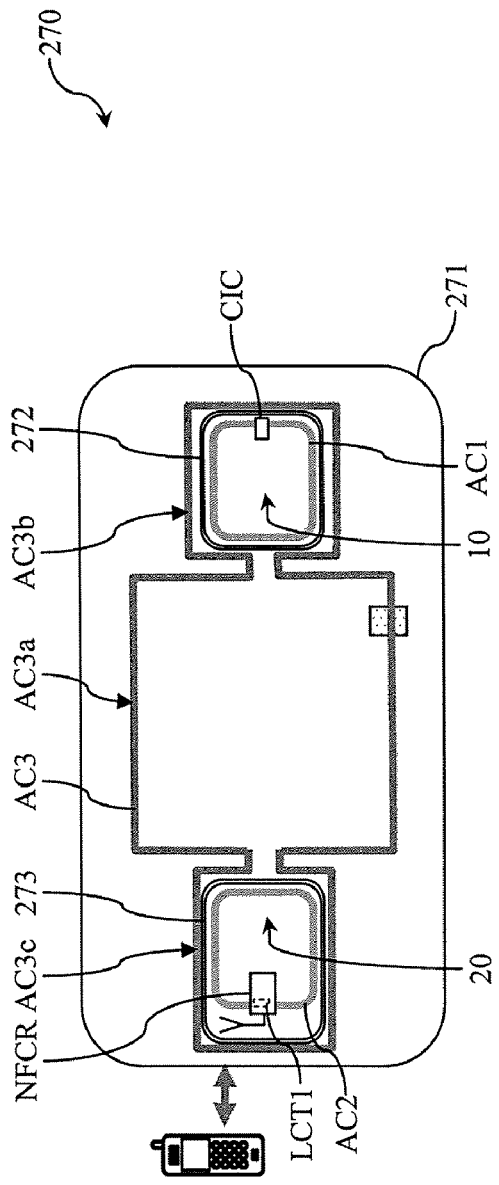
Fig. 20A
Fig. 20B

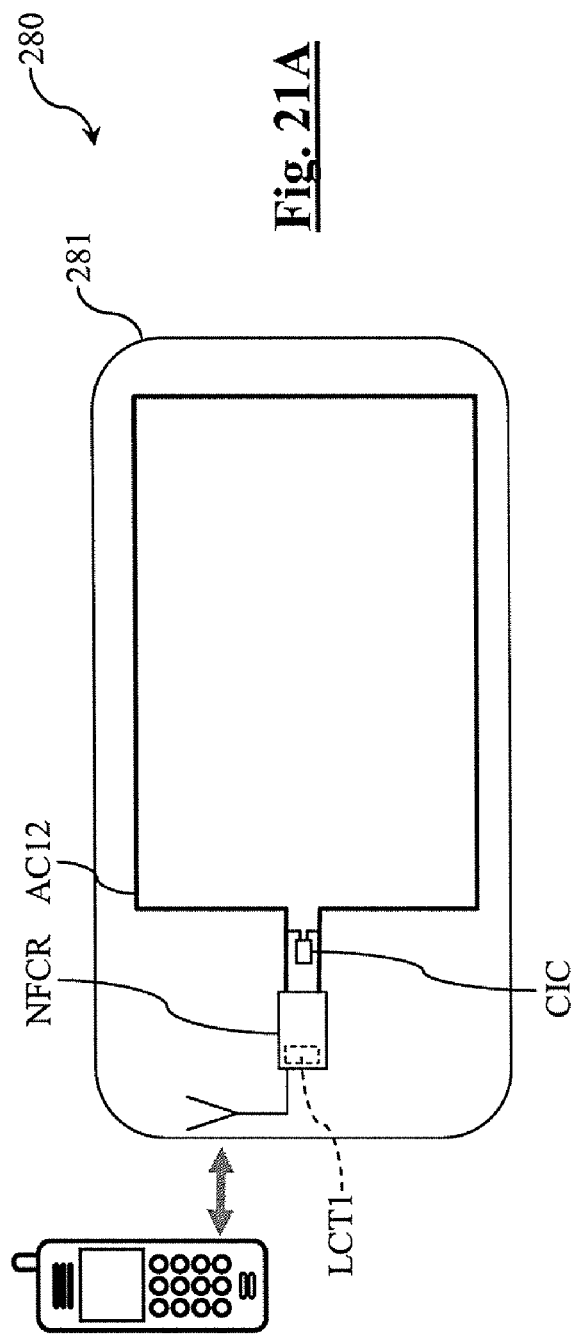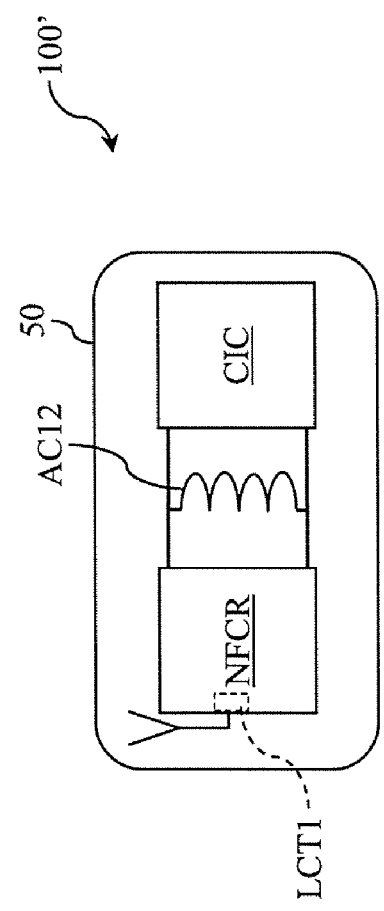

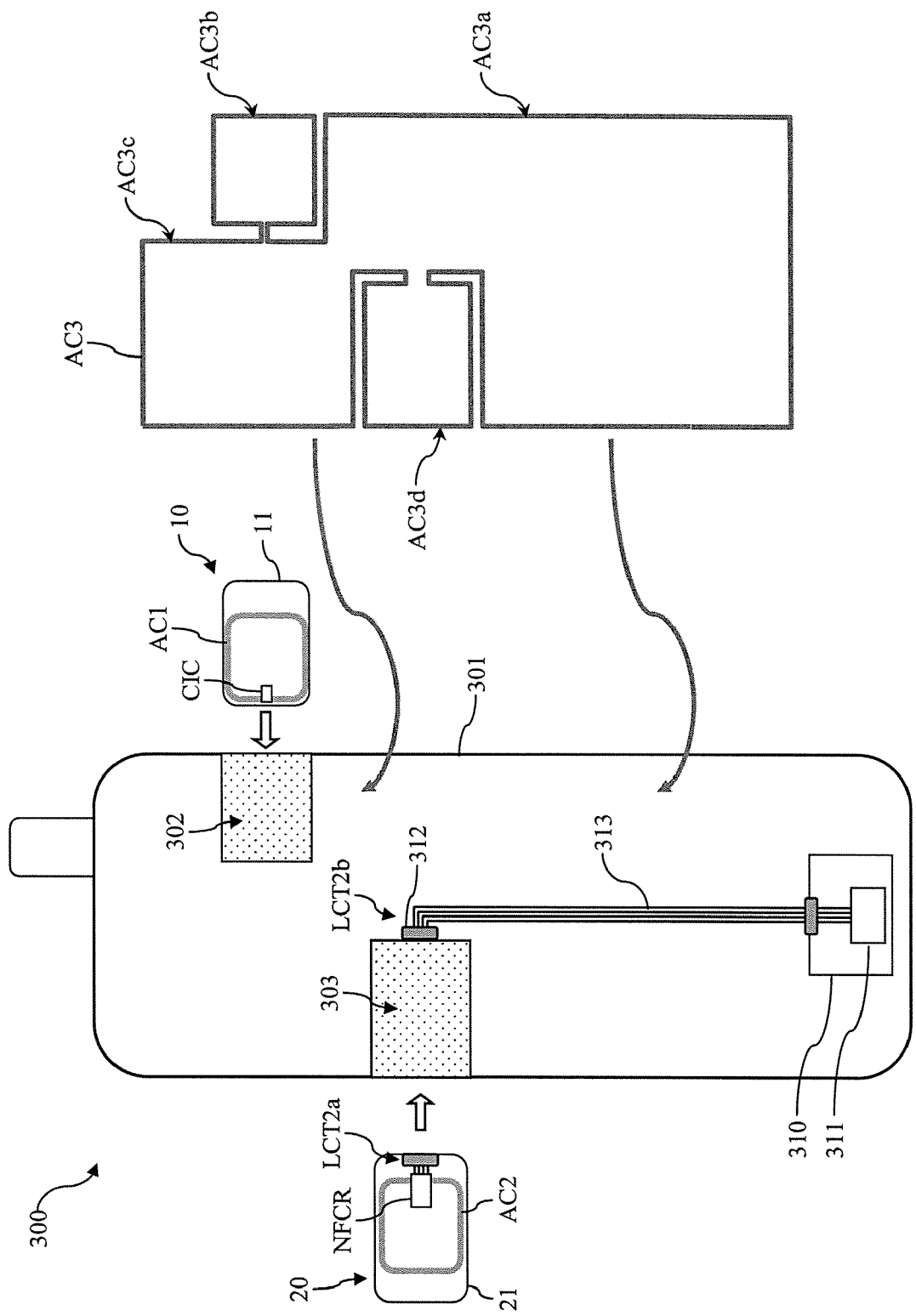

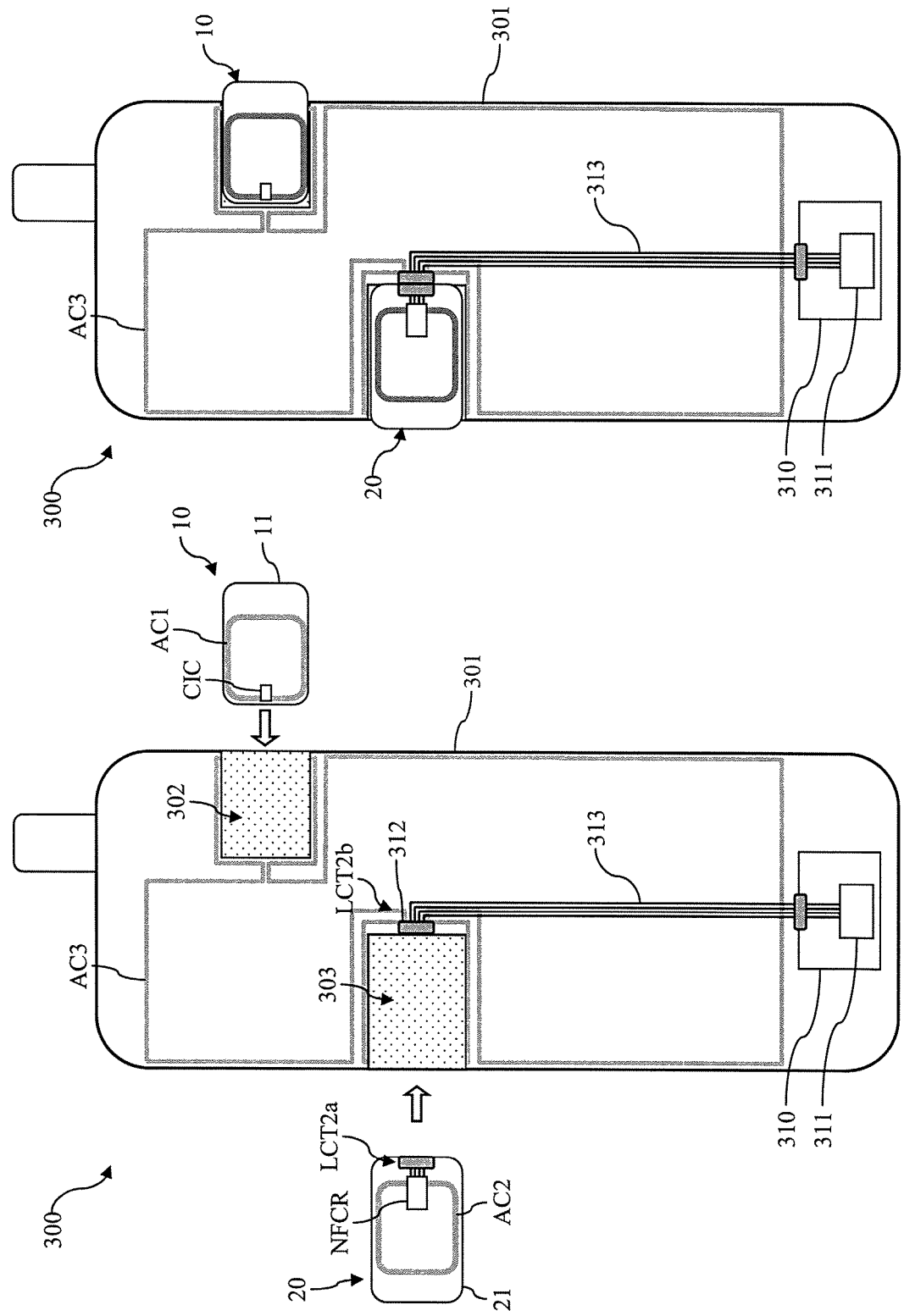

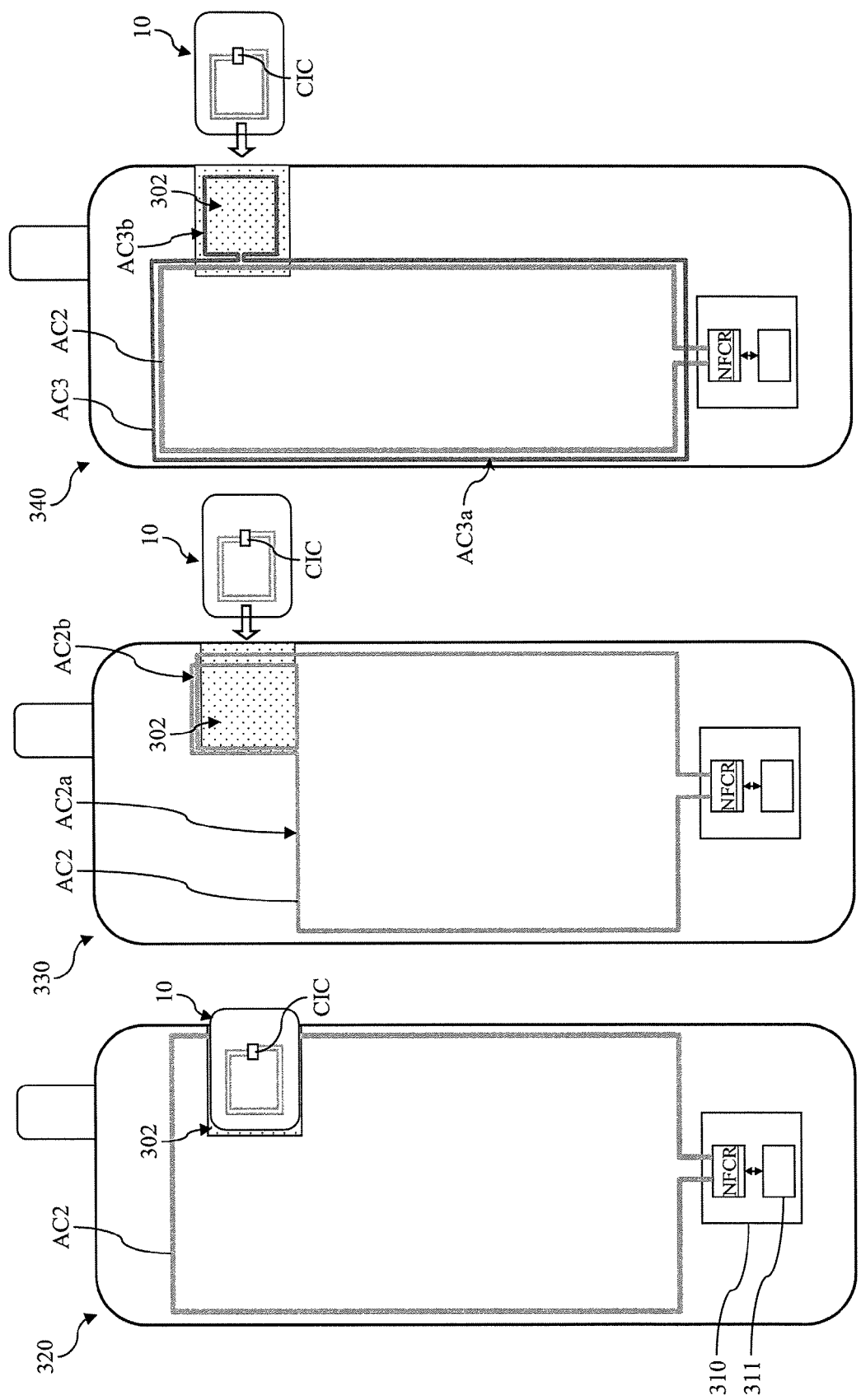

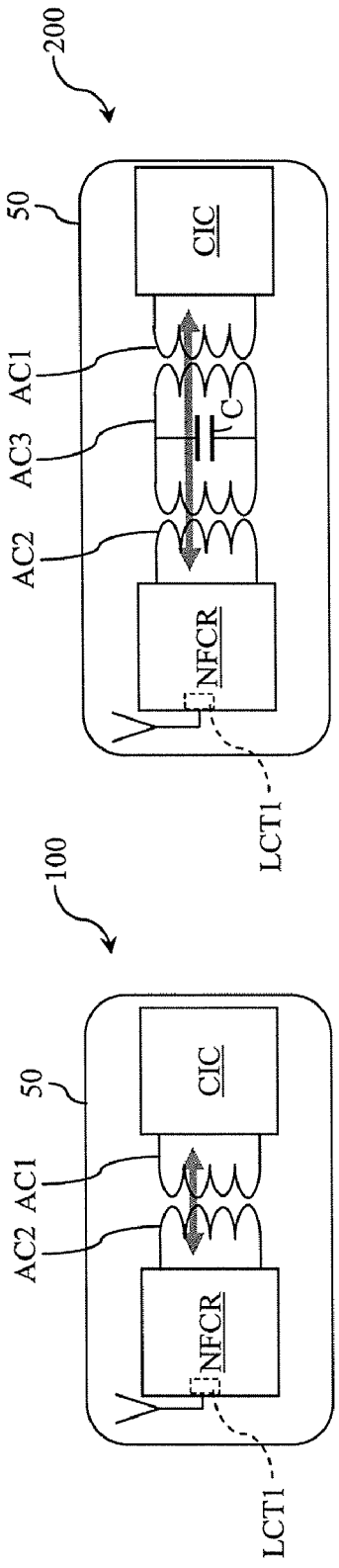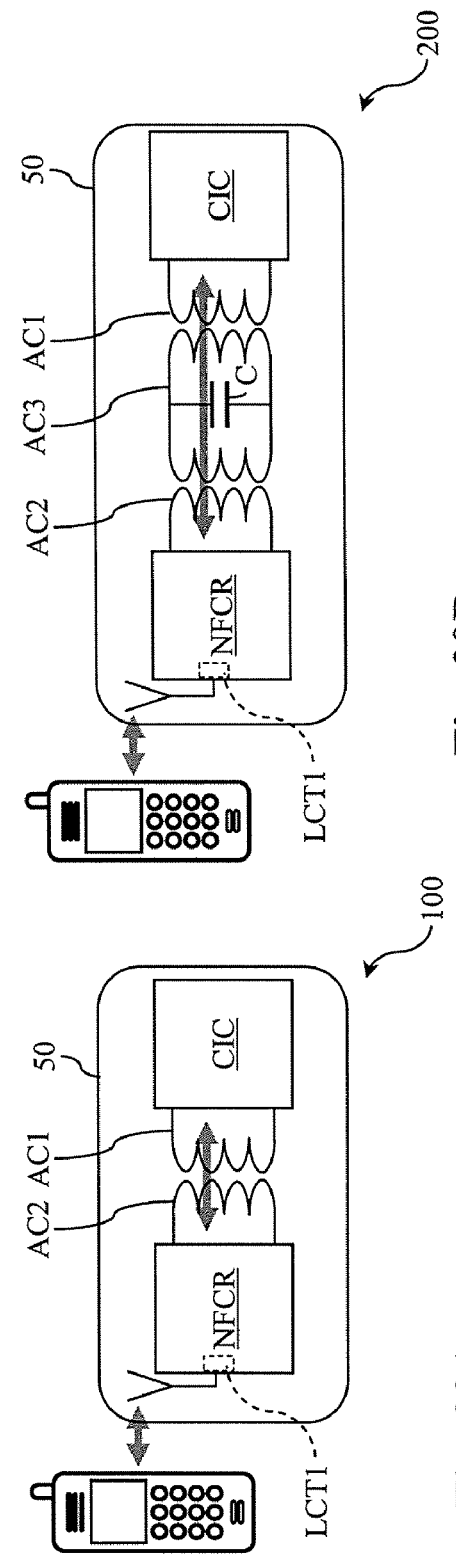
Fig. 29B
Fig. 30B
Fig. 29A
Fig. 30A

NFC MODULE, IN PARTICULAR FOR MOBILE PHONE

FIELD OF INVENTION

The present invention relates to the NFC technology (Near Field Communication).

BACKGROUND

The NFC technology uses components comprising a communication interface operating by inductive coupling and having at least two operating modes, in particular a Reader Mode and a Card Emulation Mode. In the reader mode, or active mode, a NFC component operates like a conventional RFID reader (Radio Frequency Identification) to read or write access a contactless integrated circuit mounted in a chip card or an electronic tag. The NFC component emits a magnetic field, sends data by modulating the magnetic field and receives data by retromodulation (charge modulation). In the emulation mode the NFC component operates as a transponder to dialog with a RFID reader or another NFC component in the active mode, and to be seen by the reader or the other NFC component like a RFID contactless integrated circuit. Thus, the NFC component in the card emulation mode does not emit any magnetic field, receives data by demodulating a magnetic field emitted by the other reader and sends data by retromodulation. In addition to these operating modes, a NFC component may implement several contactless communication protocols, for example ISO 14443-A, ISO 14443-B and Felica.

FIG. 1 shows a chipset made around a NFC component designated by reference "NFCM" and integrated into a mobile phone 15. The NFC component is connected to host processors HP1, HP2. The processor HP1 is for example a secured integrated circuit of SIM type ("Subscriber Identity Module") adapted to contactless applications, and the processor HP2 is for example a non-secured processor like the baseband circuit of the mobile phone. The resources of the NFC component and particularly the communication interface thereof are used by the processors HP1, HP2 to manage contactless applications. Example applications of T1, T2 or T3 type are shown in FIG. 2. In T1 type applications, the NFC component of the phone 15 is in the emulation mode to be read by a conventional reader RD or by another component NFCM' in the active mode (FIG. 1). They usually are applications of payment or paying access control (payment machines, metro entrances, etc.). The mobile phone 15 is then used like a chip card. In T2 type applications, the NFC component is in the reader mode to read or write a contactless integrated circuit CIC, for example an electronic business card or an advertising electronic tag, or to read or write a component NFCM' being in the card emulation mode. The mobile phone is in this case used like a card reader. In T3 type applications, the NFC component of the phone 15 dialogs with a component NFCM' built-in a mobile phone 15', in a computer or any other device. The operating mode of the NFC component may be passive or active.

T2 and T3 applications are usually managed by the non-secured processor HP2 whereas T1 type applications are most often managed by the secured processor HP1, as shown in FIG. 1, because the access to service requires a secured identification of subscribers including a phase of authentication comprising an encryption circuit. Free and non-secured T1 type applications may however be managed by the processor HP2, for example reading data of the details-type (i.e. addresses and phone numbers) in the phone, etc. Conversely, T2 type applications could be managed by the secured processor HP1 if reading data out of an external contactless integrated circuit is submitted to subscription or prepayment conditions.

Thus, the NFC technology allows a mobile phone (or another portable device) to communicate using the contactless technology, and allows it to behave like a contactless reader (NFC component in the active mode) to read cards, electronic tags or data in another mobile phone, or to behave like a contactless card (emulation mode) to be read by card readers or by another mobile phone.

The market most motivating the integration of the NFC technology into mobile phones is the payment market. Thus, some banks start spreading out contactless credit cards to make some purchases with the aim of replacing conventional contact cards. Transport operators are also interested in the replacement of contactless cards by mobile phones including a NFC function, in order to reduce the system costs by reducing the purchase of cards and the possibility to add new services thanks to the ability to connect to a system via the mobile phone. In addition, this contactless connectivity function of the phone may be interesting for numerous applications in order to offer services but also for security reasons so as to be able to make online payment transactions and to be able to load software into the phone.

The fact that the mobile phone may behave like a reader makes it possible to consider other types of applications linked to electronic identification. It is thus possible to "stick" a contactless electronic tag to an object and use the phone to read or write data in the contactless integrated circuit of the tag. These applications do not usually require security as they are not linked to payment. These applications are for example reading/writing of an electronic tag fastened to a book in the library to store comments, to store and read the prescription to take a medicine, to store and read data on an electronic business card, to read data in a contactless integrated circuit fixed to an advertising poster, to access information or buying services, etc.

However, spreading out NFC applications comes up against numerous constraints. In particular, the integration of NFC components in mobile phones requires substantially modifying the motherboards of mobile phones, which implies important industrial investments. In addition, an industrial consensus must be found about the communication interface between the secured host processor HP1 and the NFC component and the way to store and manage the secured application. To that end, various protocols have been suggested like the S2C protocol and the SWP protocol (ISO/IEC JTC 1 N8018 standard project). In addition, the integration of a secured contactless integrated circuit into a NFC chipset requires the provision of an integrated circuit different from those already existing in the field of contactless payment. Thus, the production of contactless integrated circuits must be split between integrated circuits intended to be connected to a NFC component (via a SWP interface for example) and integrated circuits intended to receive an antenna coil to operate autonomously, which increases the production costs. However, multiplying the models of secured integrated circuits causes a complication of the bank qualification process. Indeed, any change brought to a secured integrated circuit implies that the contactless integrated circuit goes through the qualification process again.

Eventually, because of its cost, the NFC technology will be integrated into various models of mobile phones when the market demand is sufficient. However, to create such a demand, NFC applications must be developed. But such applications will be developed only if the NFC functionality is integrated in most commercialized mobile phones. It is thus a vicious circle: the NFC applications do not develop because there are few NFC phones and there are few NFC phones because there are few NFC applications. The market of NFC components is thus brought to a slow development, whereas the technology has reached maturity. Thus, it is estimated that mobile phones equipped with NFC functionalities will not represent more than 2% of all the mobile phones on the market in 2010.

Some embodiments of the present invention are based on the postulate that a NFC component may not be considered as a chipset core to which various host processors are connected, as it is the case in the standard architecture shown in FIG. 1, in which the efforts of the industry have concentrated, but as a simple intermediate means for data transfer from one point to another.

Some embodiments of the invention are also based on the simple but no less inventive idea to make a functional module by gathering on a same support a NFC reader and a passive contactless integrated circuit. Each of the contactless integrated circuit and the NFC reader are equipped with an antenna coil and both antenna coils are coupled. A communication may therefore be established between these components but each component may also be used independently of one another.

In prior art, a NFC reader is admittedly intended to communicate with a contactless integrated circuit but these two components are not designed to be gathered on a same support. Usually, the contactless integrated circuit is arranged on a first support of which it performs the identification or authentication whereas the NFC reader is integrated in a different device to ensure the reading of the contactless integrated circuit. The NFC reader and the contactless integrated circuit are occasionally put in presence, during a transaction or identification, but are not permanently gathered on a same support. Gathering these two components on a same support gives rise to a functional object having advantageous features. Thus, the passive contactless integrated circuit may be used independently of the NFC reader, for payment applications for example. A contactless integrated circuit already certified is therefore able to be incorporated in the functional module without requiring a new certification since the integration thereof in the functional module does not require the communication interface thereof being modified. The contactless integrated circuit may also be read by the NFC reader and the data that are read therein may be transferred into a master device like a mobile phone or a similar device. In addition, the NFC reader may read by itself contactless integrated circuits other than that integrated in the functional module, or be read by an external reader (if it has the card emulation mode).

Some embodiments of the invention are also based on the idea of integrating in such a functional module a link circuit of a very widespread type and generally included in most current phones, like a Bluetooth® interface circuit. A functional module is then made, that may communicate with a mobile phone not having the NFC functionality. Once the functional module is associated to the phone as Bluetooth® peripheral, the phone benefits from the NFC functionality of the module via the Bluetooth® link. The implementation of NFC applications may therefore be envisaged without requiring the revision of the motherboard of the phone and only requires loading application software into the phone. The functional module thus allows NFC applications to be offered to users of conventional phones. It may be simply fixed on the external shell of the phone or conserved by the side thereof.

Some embodiments of the invention are also based on the idea of integrating such a functional module into a mobile phone which case is then used as support of the NFC reader and the passive contactless integrated circuit, while keeping the coupling of the antenna coil of the reader and the integrated circuit as communication means between the NFC reader and the contactless integrated circuit. The latter may be mounted into the phone in a removable way, for example by means of an introduction slot. The NFC reader may also be mounted into the phone in a removable way, for example by means of another slot, or be integrated into the motherboard of the phone.

Some embodiments of the invention are also based on the idea of providing an additional antenna coil in the functional module. The additional antenna coil is coupled to the antenna coil of the contactless integrated circuit. The additional antenna coil makes it possible to increase the communication distance of the contactless integrated circuit with an external device, or to couple the antenna coil of the NFC reader with the antenna coil of the contactless integrated circuit, or to increase the coupling rate between the antenna coil of the NFC reader and that of the contactless integrated circuit.

SUMMARY

More specifically, one embodiment of the invention provides a method for storing and exchanging contactless data, comprising: providing a functional module comprising a common portable support, at least one passive contactless integrated circuit in the form of a first semi-conductor chip, and a contactless integrated circuit reader in the form of a second semi-conductor chip, the contactless integrated circuit and the reader being gathered on or in the common portable support, an antenna coil of the contactless integrated circuit, connected to the contactless integrated circuit, an antenna coil of the reader, connected to the reader, the antenna coil of the contactless integrated circuit being coupled to the antenna coil of the reader; and using the contactless integrated circuit and the reader of the contactless module to store data and to exchange data with external devices.

According to one embodiment, the method comprises providing in the contactless module at least one additional antenna coil to perform at least one of the following functions: increasing the communication distance of the contactless integrated circuit, coupling the antenna coil of the contactless integrated circuit and the antenna coil of the reader, increasing the coupling rate between the antenna coil of the contactless integrated circuit and the antenna coil of the reader.

According to one embodiment, the method comprises providing in the functional module a link circuit connected to the reader or integrated thereto, and configuring the reader to exchange data with a master device via the link circuit.

According to one embodiment, the method comprises configuring the reader so that it executes a command of reading or writing the contactless integrated circuit, a command of reading or writing an external device, a command of transferring to the master device, via the link circuit, data read in the contactless integrated circuit, and a command of transferring to the master device, via the link circuit, data read in the external device.

According to one embodiment, the method comprises associating the functional module with a master device chosen in the group comprising mobile phones, PDAs, game consoles, portable audio or video players and personal computers.

According to one embodiment, the method comprises providing in the functional module a Bluetooth® interface circuit as link circuit.

According to one embodiment, the method comprises providing in the functional module a contact connector as link circuit.

According to one embodiment, the method comprises mounting the reader on or in the portable support by means of an intermediate support.

According to one embodiment, the method comprises mounting the contactless integrated circuit on or in the portable support by means of an intermediate support.

According to one embodiment, the method comprises integrating the functional module in an earphone of mobile phone, linking the reader to a processor of the earphone, and transmitting to the processor data received by the reader or the contactless integrated circuit by inductive coupling.

According to one embodiment, the method comprises providing in the functional module an electric power supply including an electric battery or a capacitor electrically charged by a remote power feeding circuit.

According to one embodiment, the method comprises using as reader a NFC component comprising a reader operating mode and an emulation operating mode wherein the NFC component emulates the operation of a contactless integrated circuit.

According to one embodiment, the method comprises providing in the contactless integrated circuit an encryption circuit to perform secured transactions comprising a step of authentication of the contactless integrated circuit.

According to one embodiment, the method comprises: associating the functional module with a master device, writing data into the contactless integrated circuit, by inductive coupling, by means of an external device, reading the data written in the contactless integrated circuit by means of the reader, and transferring to the master device, via the link circuit, the data read in the contactless integrated circuit.

According to one embodiment, the method comprises: associating the functional module with a master device, sending data to the reader by means of the master device, via the link circuit, writing the data in the contactless integrated circuit by means of the reader, and reading the data written in the contactless integrated circuit by means of an external device different from the master device, and memorizing the data in the external device.

According to one embodiment, the method comprises integrating the functional module into a portable device forming a peripheral accessory of mobile phone, the portable device including a processor and the link circuit, reading by inductive coupling an audio or video file by means of the reader, and transferring the audio or video file to the processor of the portable device According to one embodiment, the audio or video file is read in the contactless integrated circuit.

According to one embodiment, the method comprises writing in the contactless integrated circuit the audio or video file, by inductive coupling and by means of an external device, before reading the audio or video file by means of the reader.

According to one embodiment, external device is a contactless integrated circuit reader or a NFC component.

According to one embodiment, the external device is a contactless integrated circuit reader, and comprising switching the reader of the functional module in a contactless integrated circuit emulation mode to receive the data from the external device.

According to one embodiment, the invention also provides a functional module for storing and exchanging data, comprising: a common portable support, at least one passive contactless integrated circuit in the form of a first semi-conductor chip, and a contactless integrated circuit reader in the form of a second semi-conductor chip, the contactless integrated circuit and the reader being gathered on or in the common portable support, an antenna coil of the contactless integrated circuit, connected to the contactless integrated circuit, and an antenna coil of the reader, connected to the reader, the antenna coil of the contactless integrated circuit being coupled to the antenna coil of the reader.

According to one embodiment, the module comprises an additional antenna coil ensuring at least one of the following functions: increasing the communication distance of the contactless integrated circuit, coupling the antenna coil of the contactless integrated circuit and the antenna coil of the reader, increasing the coupling rate between the antenna coil of the contactless integrated circuit and the antenna coil of the reader.

According to one embodiment, the module comprises a link circuit connected to the reader or integrated thereto, configured to allow the reader to exchange data with a master device.

According to one embodiment, the reader is configured to receive via the link circuit and to execute: a command of reading or writing the contactless integrated circuit, a command of reading or writing an external device by inductive coupling, a command of transferring via the link circuit data read in the contactless integrated circuit, and a command of transferring via the link circuit data read in the external device.

According to one embodiment, the link circuit comprises a Bluetooth® interface circuit.

According to one embodiment, the link circuit comprises a contact connector.

According to one embodiment, the reader is mounted on or in the portable support by means of an intermediate support.

According to one embodiment, the contactless integrated circuit is mounted on or in the portable support by means of an intermediate support.

According to one embodiment, the module comprises an electrical power supply including an electric battery or a capacitor electrically charged by a remote power feeding circuit.

According to one embodiment, reader is a NFC component comprising an operating mode in which the NFC component emulates the operation of a contactless integrated circuit and may dialog with another reader.

According to one embodiment, the contactless integrated circuit is a secured circuit comprising an encryption circuit to make secured transactions comprising a step of authentication of the contactless integrated circuit.

According to one embodiment, the invention also provides an earphone of mobile phone comprising the above-mentioned functional module, the reader being linked to a processor of the earphone and configured to transfer to the processor data received by inductive coupling by the reader or by the contactless integrated circuit.

According to one embodiment, the invention also provides a mobile phone comprising the above-mentioned functional module, the reader being linked to a processor of mobile phone and configured to transfer to the processor data received by inductive coupling by the reader or by the contactless integrated circuit.

According to one embodiment, the invention also provides a system for storing and exchanging data, comprising: a functional module, and a master device linked to the functional module by means of a link circuit, wherein the functional module comprises: a common portable support, at least one passive contactless integrated circuit in the form of a first semi-conductor chip, and a contactless integrated circuit reader in the form of a second semi-conductor chip, the contactless integrated circuit and the reader being gathered on or in the common portable support, an antenna coil of the contactless integrated circuit, connected to the contactless integrated circuit, and an antenna coil of the reader, connected to the reader, the antenna coil of the contactless integrated circuit being coupled to the antenna coil of the reader.

According to one embodiment, the reader is configured to execute the following commands, sent by the master device: a command of reading or writing the contactless integrated circuit, a command of reading or writing an external device different from the master device, a command of transferring to the master device data read in the contactless integrated circuit, and a command of transferring to the master device data read in the external device.

According to one embodiment, the link circuit comprises a Bluetooth® interface circuit.

According to one embodiment, the link circuit comprises a contact connector.

According to one embodiment, the master device is chosen in the group comprising mobile phones, PDAs, game consoles, portable audio or video players and personal computers.

BRIEF DESCRIPTION OF THE DRAWINGS

Example embodiments of the invention will be described below in relation with, but not limited to the appended figures wherein:

FIGS. 10A and 10B are respectively top and section views of an embodiment of a functional module according to the invention, FIG. 11 is a top view of another embodiment of a functional module according to the invention, FIG. 12 is a top view of another embodiment of a functional module according to the invention, FIG. 13 is a top view of another embodiment of a functional module according to the invention, FIG. 16 is a top view of another embodiment of a functional module according to the invention, FIG. 17 is a top view of another embodiment of a functional module according to the invention, FIG. 18 is a top view of another embodiment of a functional module according to the invention, FIG. 19 is a top view of another embodiment of a functional module according to the invention, FIGS. 20A and 20B are top views of another embodiment of a functional module according to the invention, FIG. 21A is a top view of another embodiment of a functional module according to the invention, and FIG. 21B is the electrical diagram of the functional module, FIGS. 22A, 22B, 22C are top views of another embodiment of a functional module according to the invention, respectively shown in exploded view, partially assembled and assembled, FIG. 23 is a top view of another embodiment of a functional module according to the invention, FIG. 24 is a top view of another embodiment of a functional module according to the invention, FIG. 25 is a top view of another embodiment of a functional module according to the invention, FIGS. 27A, 27B, 28A, 28B, 29A, 29B, 30A and 30B show examples of use of a functional module according to the invention.

DETAILED DESCRIPTION OF THE PREFERRED EMBODIMENTS

Example of Conventional Contactless Module

Figure 3:
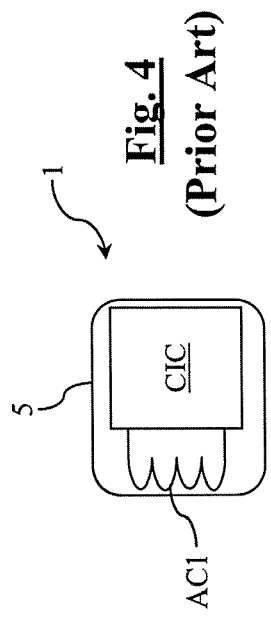
FIG. 3 shows a conventional contactless module.
Figure 4:
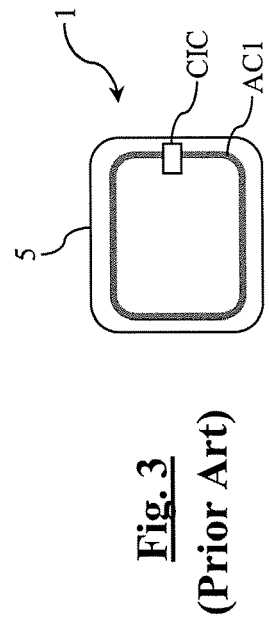
FIG. 4 is the electrical diagram of the module of FIG. 3, FIGS. 5 and 6 are electrical diagrams of embodiments of a functional module according to the invention.

FIG. 3 shows a conventional contactless module 1 comprising a contactless integrated circuit CIC connected to an antenna coil AC1, the whole being arranged on a support 5 or embedded into the support 5. According to the dimensions of the support, the module 1 may form a contactless chip card, a contactless tag or any other contactless portable electronic object. FIG. 4 is the electrical diagram of module 1. The contactless integrated circuit CIC is shown in block form and the antenna coil AC1 in the form of schematic electrical coil.

Electrical Diagrams of Embodiments of the Invention

Figure 5:
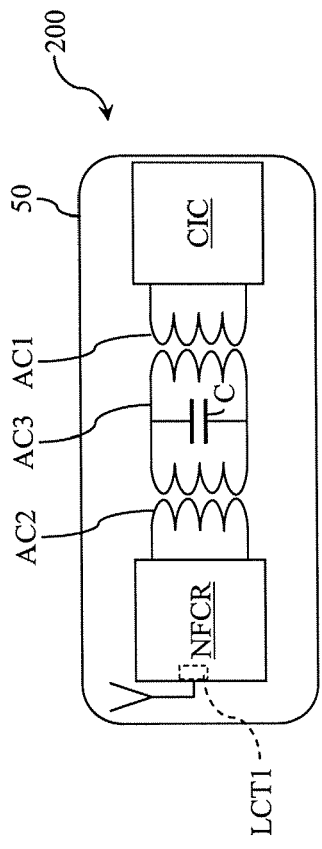

The electrical diagram of a functional module 100 according to one embodiment of the invention is shown in FIG. 5. The module 100 comprises a contactless integrated circuit CIC and a component NFCR gathered on a common support 50. The contactless integrated circuit CIC is connected to an antenna coil AC1 and the component NFCR is connected to an antenna coil AC2. Each of the contactless integrated circuit CIC and the component NFCR take the shape of a semi-conductor chip. The antenna coils AC1 and AC2 are shaped and arranged so that they are coupled one to another. Thus, the component NFCR can exchange data with the contactless integrated circuit CIC. The integrated circuit CIC is preferably of the passive type and does not require any other power supply than a magnetic field. The electrical power of the component NFCR is supplied by a power supply circuit that may comprise an accumulator (electrical battery) mounted on or embedded in the support 50, or any other type of known feeding circuit. In particular, it may be a remote power feeding circuit ensuring the extraction of a supply voltage from a near magnetic or electrical field, or a capacitor which is charged by remote power feeding and stores a sufficient quantity of electricity to electrically feed the component NFCR during periods of use thereof.

In one embodiment, the functional module 100 comprises a wireless link circuit LCT1, in order to communicate with a master device (not shown) and receive in particular commands (reading, writing, operation mode, configuration, etc.). The link circuit LCT1 is for example a Bluetooth® interface circuit able to be integrated in the component NFCR. This interface circuit allows a data link to be established between the component NFCR and a device comprising a similar link circuit, for example a Bluetooth® phone.

Figure 6:
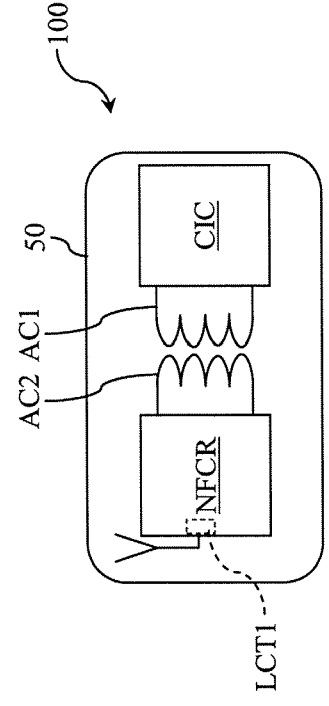

The electrical diagram of a functional module 200 according to another embodiment of the invention is shown in FIG. 6. The module 200 differs from the module 100 in that it comprises an additional antenna coil AC3 which is connected neither to the component NFCR nor to the contactless integrated circuit CIC. The antenna coil AC3 is coupled to the antenna coil AC1 of the circuit CIC and is provided for at least one of the following reasons:

a. to increase the communication distance of the contactless integrated circuit,
b. to make a coupling appear between the antenna coils AC1 and AC2,
c. to increase the coupling rate between the antenna coils AC1 and AC2 if they are arranged so that they are coupled in the absence of the antenna coil AC3.

In the cases ii) and iii) the antenna coil AC3 is also coupled to the coil AC2 of the component NFCR. The antenna coil AC3 can be tuned by means of a capacitor C on the working frequency Fc of the antenna coils AC1 and AC2, for example 13.56 MHz (frequency most currently used in RFID applications and recommended for example by the ISO 14442 and ISO 15693 standards).

Example Architecture of Contactless Integrated Circuit

Figure 2:
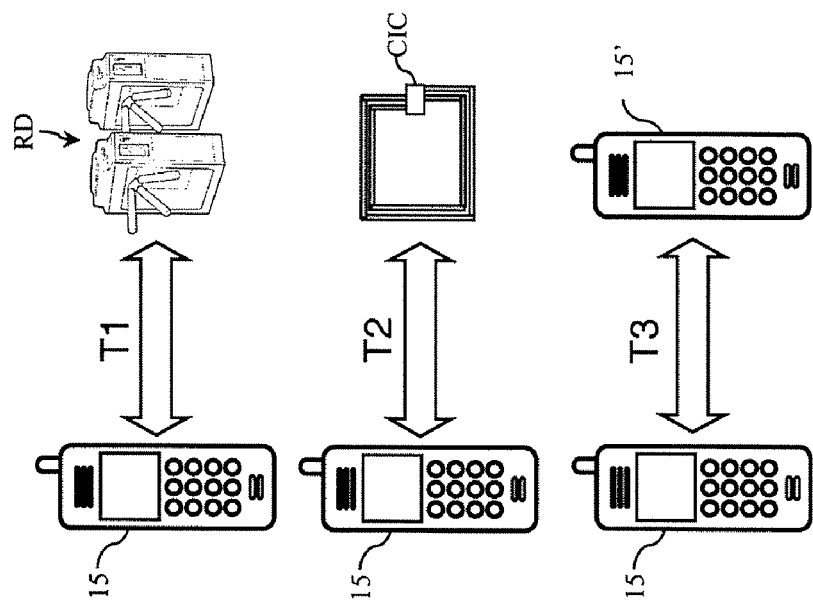
FIG. 2 shows example NFC applications.
Figure 1:
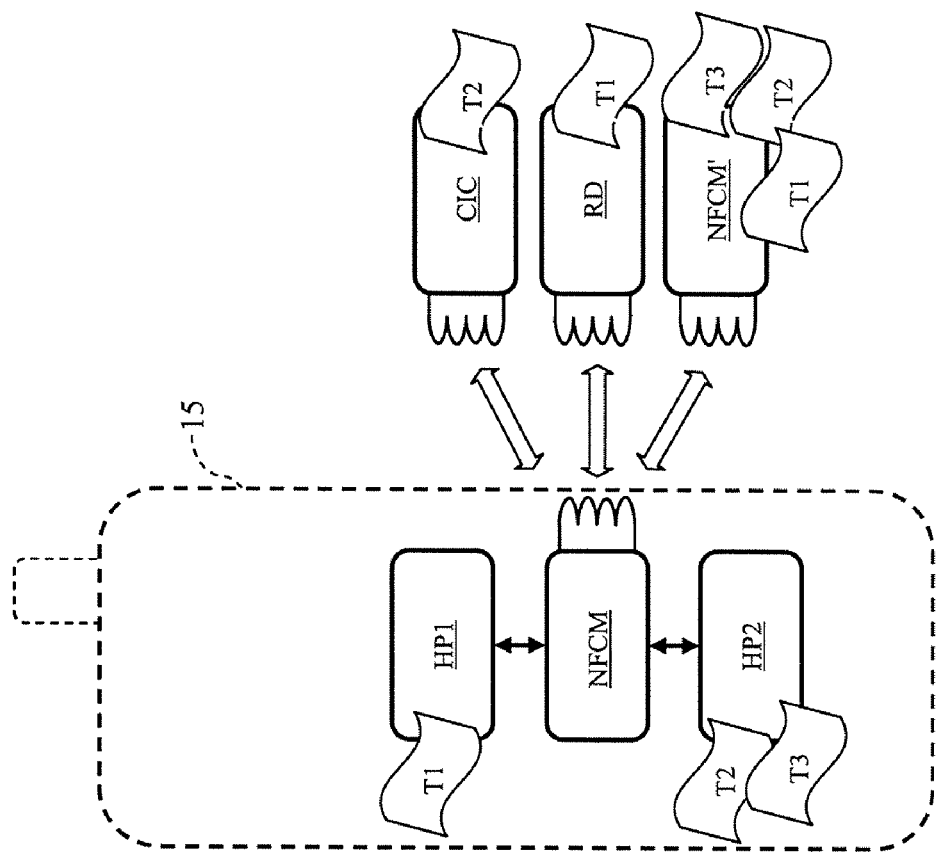
FIG. 1 previously described shows a conventional NFC chipset and external devices susceptible of communicating with the chipset.
Figure 7:
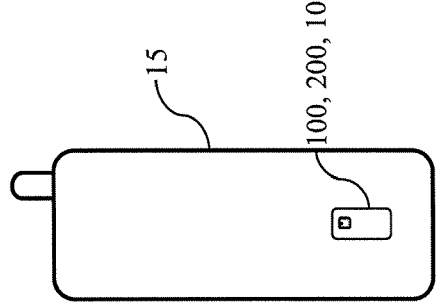
FIG. 7 shows an embodiment of a functional module according to the invention placed on a mobile phone.

FIG. 7 shows the module 100, 200 fixed on the case of a mobile phone 15, for example on the rear face of the phone. The module 100, 200 may for example be fixed on the phone by means of an adhesive material. The module 100, 200 may communicate with the phone by means of the link circuit LCT1, for example a Bluetooth® link, as slave device. The module 100, 200 thus linked to the mobile phone makes it possible to implement numerous NFC applications that the industry wants to implement today using an architecture of NFC chipset on a phone motherboard as shown in FIG. 1. The advantage that the module 100, 200 offers in relation to such a chipset in to be able to be made at low cost and offered to consumers quasi immediately, without waiting that the technical issues or the standard issues relative to the manufacture of NFC chipsets are solved.

Figure 8:
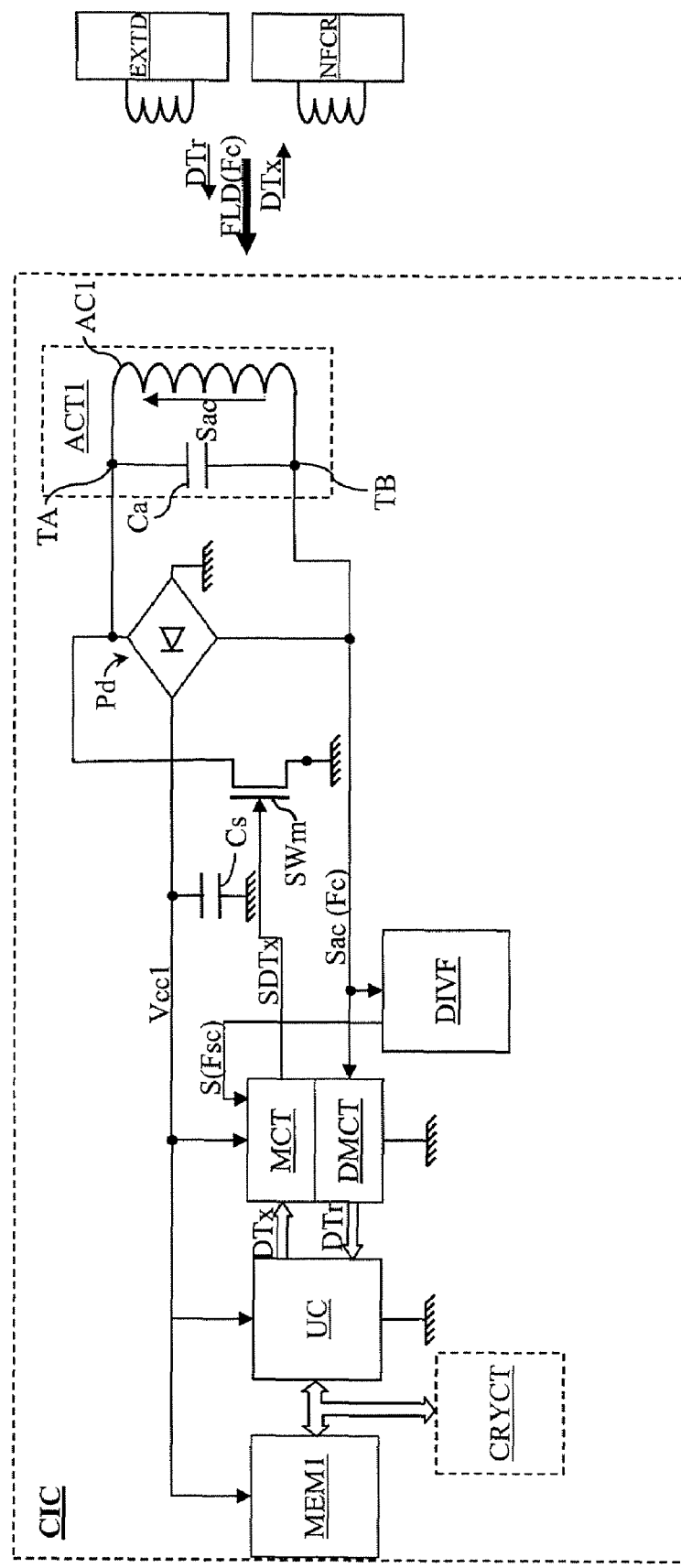
FIG. 8 shows a conventional architecture of a contactless integrated circuit that may be incorporated in a functional module according to the invention.

FIG. 8 is an example of conventional architecture of a passive contactless integrated circuit able to be used as a circuit CIC in the functional module 100, 200. The architecture shown is only an example among various known architectures of contactless integrated circuits. The integrated circuit CIC comprises an antenna circuit ACT1, a retromodulation switch SWm, for example a switch transistor, a modulation circuit MCT, a demodulation circuit DMCT, a central unit UC (wired-logic sequencer or microprocessor) and a memory MEM1 (memory array).

The antenna circuit comprises the antenna coil AC1 and a tuning capacitance Ca in parallel, to tune the antenna circuit around the working frequency Fc. The capacitance Ca is usually integrated on the semi-conductor substrate and the antenna coil AC1 is connected to terminals TA, TB of the integrated circuit. The integrated circuit is provided to operate in presence of a magnetic field FLD of frequency Fc. Here, this magnetic field may be emitted by an external device EXTD or by the component NFCR present in the module 100, 200. In presence of the magnetic field, an alternative antenna signal Sac of frequency Fc appears in the antenna circuit.

The memory MEM1 may comprise non volatile memory areas, for example Flash or EEPROM areas, and volatile memory areas, for example RAM areas. It may receive one or more application programs and also allows application data to be stored. The central unit UC provides outgoing data DTx to the circuit MCT which applies to a control terminal of the switch SWm, for example the gate of the MOS transistor, a data carrier signal SDTx carrying data DTx. The switch SWm is connected to the antenna terminals TA, TB and the closing thereof (conducting state) triggers the apparition, in the antenna circuit, of a retromodulation signal (charge modulation signal) at the pace of the signal SDTx. Optionally the signal SDTx may be modulated by a sub-carrier signal Fsc oscillating at a frequency Fsc lower than the working frequency Fc, supplied by a frequency divider DIVF receiving the antenna signal Sac. The integrated circuit CIC may also comprise a diode or a diode bridge Pd to rectify the antenna signal Sac and supply the supply voltage Vcc1. The diode bridge Pd is connected to the antenna terminals TA, TB. The output thereof is connected to a smoothing capacitor Cs and supplies the voltage Vcc1.

In an embodiment, the integrated circuit CIC may be a secured component and may comprise an encryption circuit CRYCT linked to the central unit UC and the memory MEM1 through a data and address bus. In this case the circuit CRYCT transforms random words into encrypted words, in response to an authentication request sent by an external device EXTD or by the component NFCR.

Example of Architecture of Component NFCR

Figure 9:
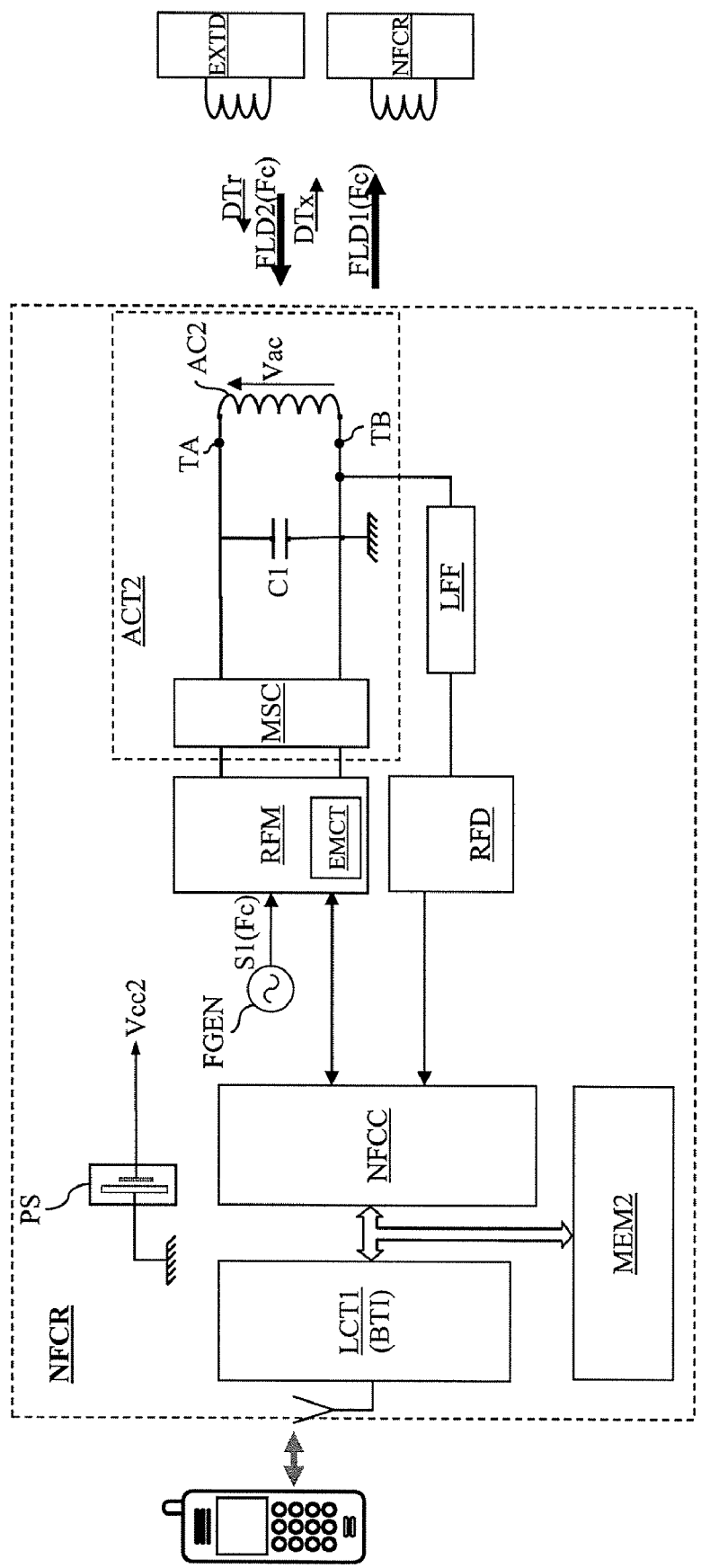
FIG. 9 shows an example architecture of a NFC component that may be incorporated in a functional module according to the invention.

FIG. 9 is an example of architecture of a NFC component than may be used in the functional module 100, 200. The component shown here is made from a conventional RFID reader architecture and optionally comprises an emulation circuit EMCT to operate in the card emulation mode.

The component NFCR comprises an antenna circuit ACT2, an electrical power supply PS supplying a voltage Vcc2, a generator FGEN including an oscillator, a modulation circuit RFM, a demodulation circuit RFD, a controller NFCC (microprocessor or microcontroller), a memory MEM2 (memory array comprising non volatile and volatile memory areas) and the link circuit LCT1 here a Bluetooth® interface circuit (BTI). As indicated above, the power supply circuit PS may be or may comprise i) an electrical battery, ii) a remote power feeding circuit provided to extract the voltage Vcc2 from a near magnetic or electrical field, iii) a capacitor which is charged by remote power feeding, or iv) a combination of these supply means.

The antenna circuit ACT2 comprises the antenna coil ACT2, connected to antenna terminals TA, TB of the semiconductor chip, and a capacitor C1 in parallel to tune the antenna circuit on the working frequency Fc. The antenna circuit may also comprise various other tuning components as well as filtering components EMI (electromagnetic radiation filtering) shown in the form of a block MSC.

The generator FGEN supplies a signal S1(Fc) for triggering the antenna circuit ACT2. The modulator RFM receives from the controller NFCC data to be sent DTx and applies the triggering signal S1(Fc) to the antenna circuit ACT2 by modulating it according to data to be sent. The triggering signal causes the apparition of an alternative voltage Vac at the terminals of the antenna coil and a magnetic field FLD1 (Fc) is emitted. The amplitude of the voltage Vac is modulated by the circuit RFM according data to be sent. In addition, the demodulation circuit RFD is linked to the antenna circuit ACT2 to receive the antenna voltage Vac through a low-pass filter LFF which suppresses the carrier Fc. The circuit RFD thus receives a retromodulation signal from which it extracts data DTr. The data DTr may be sent by the circuit CIC of the functional module or a contactless integrated circuit external to the functional module. It may also be data sent by an external NFC component operating in the card emulation mode.

In the card emulation mode, the component NFCR does not emit the magnetic field FLD1 and receives an external magnetic field FLD2(Fc) emitted by an external device EXTD that may be a NFC component in the active mode or a RFID reader. The emulation circuit EMCT performs data sending and receiving and is connected to the controller NFCC and to the terminals of the antenna circuit. In order to send or receive data, the emulation circuit EMCT operates like the circuits MCT, DMCT of the contactless integrated circuit CIC of FIG. 8 (the generator FGEN being inactive or powered off). The outgoing data are sent by retromodulation and the incoming data carried by the magnetic field FLD2 are extracted from it by decoding an envelope modulation signal.

The circuit EMCT may however be considered as optional and not be integrated in the component NFCR if the target applications do not require the card emulation mode. In that case, the component NFCR in the sense of the invention is a simple RFID reader not offering the card emulation mode.

Example Embodiments of Functional Modules on a Card-Type Support

FIGS. 10A to 13 show embodiments of functional modules 110, 120, 130, 140 which electrical diagram is conform to that of FIG. 5. FIGS. 14 to 20B show embodiments of functional modules 210, 220, 230, 240, 250, 260, 270 which electrical diagram is conform to that of FIG. 6. These figures only give a general idea of all the possibilities of implementation offered by the present invention. The shown variations mainly concern the shape and arrangement of the antennas AC1, AC2, AC3 and the arrangement of the component NFCR and the circuit CIC.

In these various figures, the functional modules are made on a card-type support, respectively 111, 121, 131, 141, 211, 221, 231, 241, 251, 261, 271, and are seen from above (except in FIG. 10B which is a section view of the module of FIG. 10A). The card-type support may be made of any known material used in prior art to make chip cards or electronic tags, particularly plastic, adhesive plastic film, paper, cardboard, wood, etc. The antenna coils AC1, AC2, AC3 may be made according to various known techniques, in particular by depositing a metallic material, by cutting a metallic material, by depositing conducting ink, etc.

The component NFCR, the contactless integrated circuit CIC and the antenna coils AC1, AC2, AC3 may be mounted at the surface of the card-type support or be embedded therein. These elements are here shown as visible for a better legibility of figures, assuming the card-type support is transparent if they are embedded therein.

It is assumed here that the component NFCR is equipped with a Bluetooth® link circuit LCT1. The UHF antenna necessary for the Bluetooth® link is schematically shown in the form of a UHF dipole antenna and may be made in various known ways, for example by means of a section of conducting path or a wire deposited or embedded in the card-type support.

The number of windings that each antenna coil AC1, AC2 has may vary and depends in practice on the specifications (communication distance desired, coupling rate, transmitting power of the magnetic field, etc.) and on the performances of the analog built-in circuitry of the component NFCR and in the integrated circuit CIC. Thus, in figures, the number of windings shown (one or two windings) is not specifically linked to the embodiment shown and may have been chosen only to improve the legibility of figures. In intersection areas of the wire or of the path forming an antenna coil, an isolating pad may be provided to avoid short-circuits.

FIGS. 10A to 13

In FIG. 10A, the antenna coil AC2 of the component NFCR goes along the periphery of the support 111 of the module 110 and entirely encircles the circuit CIC and the antenna coil AC1 thereof. FIG. 10B shows the module 110 in section view according to a central longitudinal axis. The components NFCR, CIC and the antenna coils AC1, AC2 are embedded in the support 111. FIG. 10B also shows a case 112 in card shape which is joined side by side with the rear face of the support 111 and which has two connection terminals linked to the component NFCR, to electrically power it. This case forms the power supply of the component NFCR and may comprise an electrical battery (rechargeable by means of a separate charger), a remote power feeding circuit (magnetic or electrical field rectifier circuit), a capacitor charged by a remote power feeding circuit, or a combination of these power supply means. In an embodiment the remote power feeding circuit may comprise its own antenna coil or use an antenna coil of the functional module to extract electrical energy. Besides, although shown here in a case separated from the functional module, the feeding circuit may be integrated into the support of the module.

The module 120 shown in FIG. 11 varies from the module 110 in that the contactless integrated circuit CIC is mounted in an independent micromodule 10. The micromodule 10 comprises a support 11 that receives the integrated circuit CIC and the antenna coil AC1. The micromodule 10 is of the same type as the conventional module shown in FIG. 3. The card-type support 121 of the module 120 comprises a housing 122 to receive the micromodule 10, for example a cavity of a same shape as the micromodule 10. An adhesive layer may be provided at the rear of the micromodule 10 to fix it in the housing 122. Once the micromodule 10 is mounted into the housing, the module 120 has an appearance substantially identical to the module 110, the antenna coil AC2 being of the same shape and encircling the micromodule 10. The housing receiving the micromodule 10 could also be a blind hole with an introduction slot (slot housing).

The module 130 shown in FIG. 12 varies from the module 110 of FIG. 10A by the shape of the antenna coil AC2, the support 131 being of the same shape as the support 111, the arrangement of the components NFCR and CIC being identical as well as the shape of the antenna coil AC1. The antenna coil AC2 has two co-planar loops AC2a, AC2b in series. The loop AC2a spreads on a part of the support 131 and does not encircle the antenna coil AC1, whereas the loop AC2b encircles the coil AC1 and has a diameter close thereto to increase the coupling rate between the coils AC1, AC2.

The module 140 shown in FIG. 13 has an antenna coil AC2 with two loops similar to that of the module 130. A micromodule 10 similar to that shown in FIG. 11 is used. The micromodule 11 comprises as previously the integrated circuit CIC and the antenna coil AC1 mounted or embedded in an independent support 11. The support 141 comprises an open housing 142 receiving the micromodule 10. The loop AC2b goes along the edge of the housing 142 and encircles the antenna coil AC2.

FIGS. 14 to 19

In FIGS. 14 to 19, the modules 210, 220, 230, 240, 250, 260 are equipped with the antenna coil AC3. The capacitor C being used to tune the antenna coil AC3 on the working frequency Fc is for example a conductor/dielectric sandwich comprising conducting pads separated by a dielectric layer.

Figure 14:
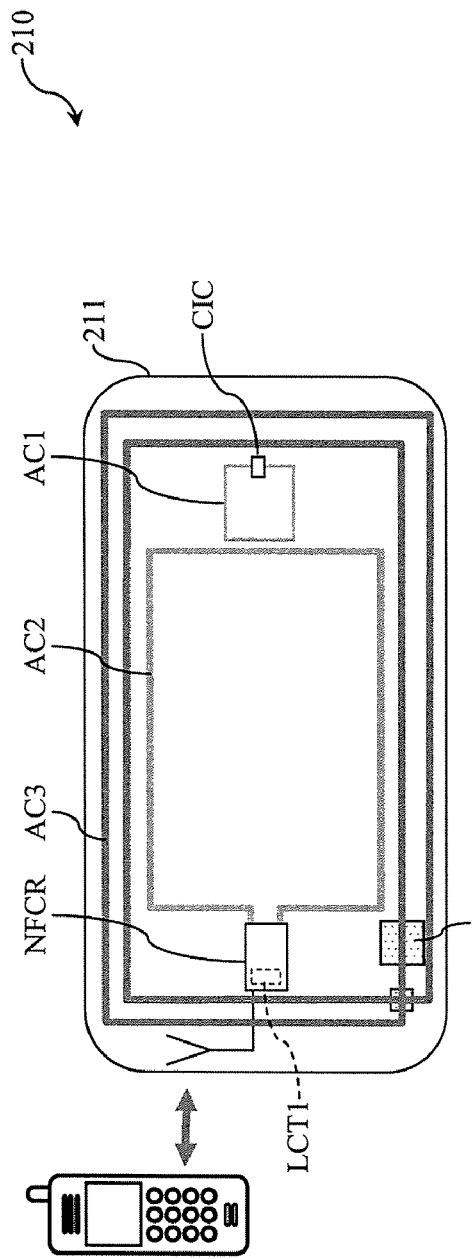
FIG. 14 is a top view of another embodiment of a functional module according to the invention.

In FIG. 14, the antenna coil AC3 of the module 210 goes along the periphery of the support 211 and encircles the antenna coils AC1, AC2. The antenna coil AC1 does not encircle the antenna coil AC2. The antenna coil AC3 provides the coupling of coils AC1, AC2 and also increases the communication distance of the integrated circuit CIC.

Figure 15:
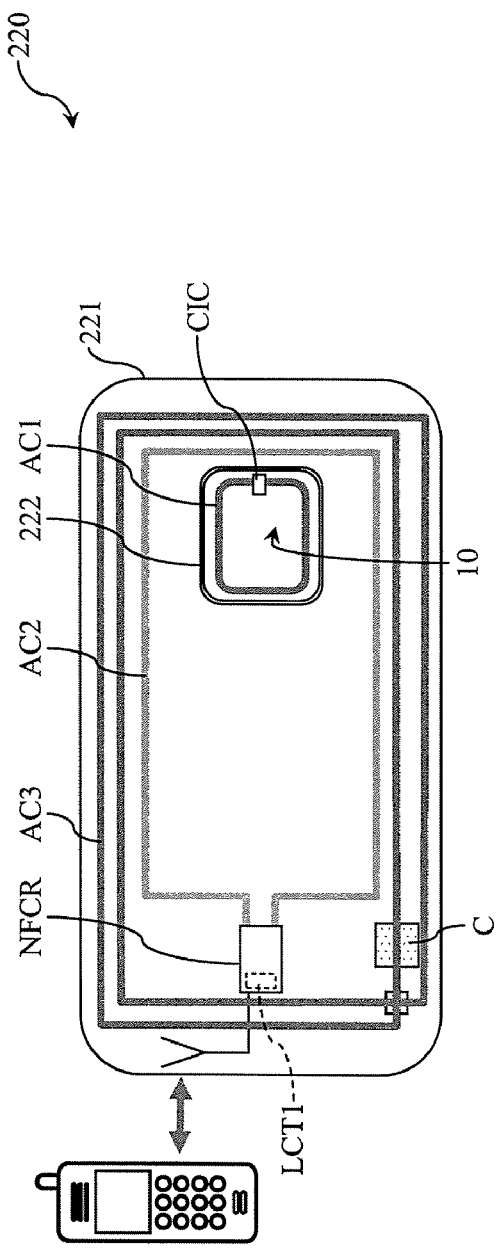
FIG. 15 is a top view of another embodiment of a functional module according to the invention.

The module 220 shown in FIG. 15 varies from the module 210 in that the contactless integrated circuit CIC and the antenna coil AC1 are mounted on or embedded in the micromodule 10 described above, which is arranged in an housing 222 provided in the support 221 of the module.

The module 230 shown in FIG. 16 differs from the module 210 shown in FIG. 14 in that the antenna coil AC3 comprises two loops AC3a, AC3b. The loop AC3a closely encircles the antenna coil AC2 and the loop AC3a closely encircles the coil AC1. The antenna coil AC3 both increases the communication distance of the contactless integrated circuit CIC thanks to the coupling thereof with the antenna coil AC1 and increases the coupling rate between coils AC1 and AC2.

The module 240 in FIG. 17 varies from the module 230 of FIG. 16 in that the contactless integrated circuit CIC and the antenna coil AC1 are mounted on or embedded in the micromodule 10. The micromodule is arranged in a housing 242 provided in the support 241. The loop AC3b goes along the edges of the housing 242.

The modules 250, 260 shown in FIGS. 18, 19 respectively vary from the modules 230, 240 shown in FIGS. 16, 17 in that the antenna coil AC2 comprises two co-planar loops AC2a, AC2b in series. The loop AC3a encircles the loop AC2a and the loop AC3b encircles the loop AC2b which encircles the antenna coil AC1. A high coupling rate is thus created between the coils AC1, AC2. In addition, the module 260 varies from the module 250 in that the contactless integrated circuit CIC and the antenna coil AC1 are mounted on or in the micromodule 10, which is arranged in a housing 262 provided in the support 261.

FIGS. 20A, 20B

The module 270 shown in FIGS. 20A, 20B comprises a card-type support 271 wherein two housings 272, 273 are provided. The housing 272 receives the module 10 already described, which comprises the contactless integrated circuit CIC and the antenna coil AC1 arranged on or embedded in the independent support 11. The housing 273 receives a micromodule 20 comprising the component NFCR and the antenna coil AC2 arranged on or embedded in an independent support 21. The antenna coils AC1 and AC2 being in this case disjoint and not coaxial, the coupling between these two coils is performed by the antenna coil AC3 that has at least two co-planar loops in series respectively encircling the antenna coil AC1 and the antenna coil AC2. Here, the antenna coil AC3 has three co-planar loops AC3a, AC3b, AC3c in series. The loop AC3a spreads on the support 271 between the two micromodules 10, 20, the loop AC3b goes along the edges of the housing 272 and encircles the antenna coil AC1. The loop AC3c goes along the edges of the housing 273 and encircles the antenna coil AC2.

In FIG. 20A the micromodules 10, 20 are shown before their mounting onto the support 271 and in FIG. 20B the micromodules have been put into the housings 272, 273. As previously, an adhesive layer may be provided on the rear face of the micromodules 10, 20. Alternately, housings with introduction slots may be provided in the support 271.

FIG. 21

FIG. 21A shows a functional module 280 according to one embodiment of the invention and FIG. 21B is the electrical diagram 100' of the module 280. Conceptually, this embodiment is obtained by putting the antenna coils AC1, AC2 closer in order to bring the inductive coupling rate between the antenna coils to its maximum value, until the two antenna coils AC1, AC2 merge to form a unique coil. The antenna coil of the component NFRC then becomes the antenna coil of the integrated circuit CIC and vice-versa and thus only a common antenna AC12 forming the antenna of each component can be seen. The operation of the module is globally unchanged, a maximum coupling being equivalent to a merge of the primary coil (AC1 or AC2) with the secondary coil (AC2 or AC1), the only difference being that the galvanic insulation between the primary and the secondary is suppressed.

Example Embodiments of Functional Modules on Other Supports

The embodiments of functional modules described above make it possible to offer at short term and with a modest industrial investment NFC modules that can be used with conventional mobile phones and allowing various NFC applications to be implemented. However, the concept of the invention is not limited to these examples. With a little significant modification of mobile phones, a functional module 100, 200 of the type shown in FIGS. 5, 6 may be integrated at short term in a mobile phone by using the case of the phone as support instead of the card-type support previously described.

Example of Integration in a Mobile Phone

FIGS. 22A, 22B, 22C show an embodiment of functional module 300 according to the invention wherein the support 301 of the component NFCR and of the contactless integrated circuit CIC is the case of a mobile phone (or a part of the case, in particular the chassis of the phone). The module is shown by an exploded view in FIG. 22A, partially assembled in FIG. 22B and assembled in FIG. 22C.

The support 301 comprises two slot housings 302, 303 to respectively receive the micromodule 10 described above (comprising the contactless integrated circuit CIC, the antenna coil AC1 and the support 11) and the micromodule 20 also described above (comprising the component NFCR, the antenna coil AC2, and the support 21). The module 300 also comprises the antenna coil AC3, used here to ensure a good coupling rate between the antenna coils AC1, AC2 and to increase the communication distance of the contactless integrated circuit CIC.

The antenna coil AC3 comprises loops in series that respectively encircle the housing 302 and the housing 303. The minimum number of loops depends on the arrangement of housings 302, 303 in the support case 301. The housings being here arranged on opposite edges of the support case 301, the antenna coil AC3 here comprises four loops AC3a, AC3b, AC3c, AC3d in series, co-planar or not (the case of the phone being a thick support not requiring that the loops are co-planar as it is the case with a card-type support). The loop AC3a spreads to the interior periphery of a part of the phone not comprising the housings 302, 303 (lower part). The loop AC3b encircles the housing 302 receiving the micromodule 10 and the antenna coil AC1. The loop AC3c spreads to the interior periphery of a part of the phone not comprising the housings 302, 303 (upper part) and the loop AC3c encircles the housing 303 receiving the micromodule 20 and the antenna coil AC2.

The component NFCR being here inserted near the motherboard 310 of the phone, which comprises the central processor 311 of the phone, the wireless link circuit LCT1 has been here replaced by a wire link circuit LCT2. The link circuit LCT2 comprises a first part LCT2a mounted on the micromodule, for example a female or male connector linked to inputs/outputs of the module NFCR, and a second part LCT2b comprising a male or female connector 312 and wires 313 linking the connector 312 to the central processor 311. The connector LCT2a on the micromodule 20 may be compatible with standard connectors used to insert memory cards in mobile phones, for example a card connector SD, and the micromodule 20 may have a shape compatible with the introduction slots of memory cards. In this case, a standard introduction slot for memory card may be used to insert the micromodule 20 in the mobile phone.

FIG. 23 shows a module 320 industrially feasible at medium term, which varies from the module 300 in that the component NFCR is directly mounted on the motherboard 310 and is linked to the central processor 311 in a conventional way, for example by means of an UART interface (universal asynchronous receiving transmitting circuit). The module 320 does not comprise the antenna coil AC3. The antenna coil AC2 goes along the interior periphery of the phone case and encircles the housing 302 which receives the micromodule 10. Thus, the antenna coil AC1 and the antenna coil AC2 are coupled.

FIG. 24 shows a module 330 that differs from the module 320 in that the antenna coil AC2a comprises two loops AC2a, AC2b in series. The loop AC2a spreads to the interior periphery of a part of the phone case and the loop AC2b encircles the housing 302 receiving the micromodule 10.

FIG. 25 shows a module 340 that differs from the module 330 in that the antenna coil AC3 is used to couple the antenna coils AC1, AC2 which are not concentric. The coil AC3 comprises a loop AC3a which encircles the antenna coil AC2 and a loop AC3b which encircles the antenna coil AC1.

In the embodiments shown in FIGS. 22A, 22B, 22C, 23, 24, and 25, the micromodule 10 comprising the integrated circuit CIC may also be a self-adhesive micromodule stuck on an external face of the phone case.

Examples of Integration into a Bluetooth® Earphone

The present invention is not limited to an application to mobile phones, which has only been cited above as main application example because the market of mobile phones represents the growth niche of the NFC technology. Generally, embodiments of the invention may be integrated in any type of electronic portable device and particularly in a PDA (Personal Digital Assistant), in a game console, in a personal computer, in a portable audio or video player, etc.

Figure 26:
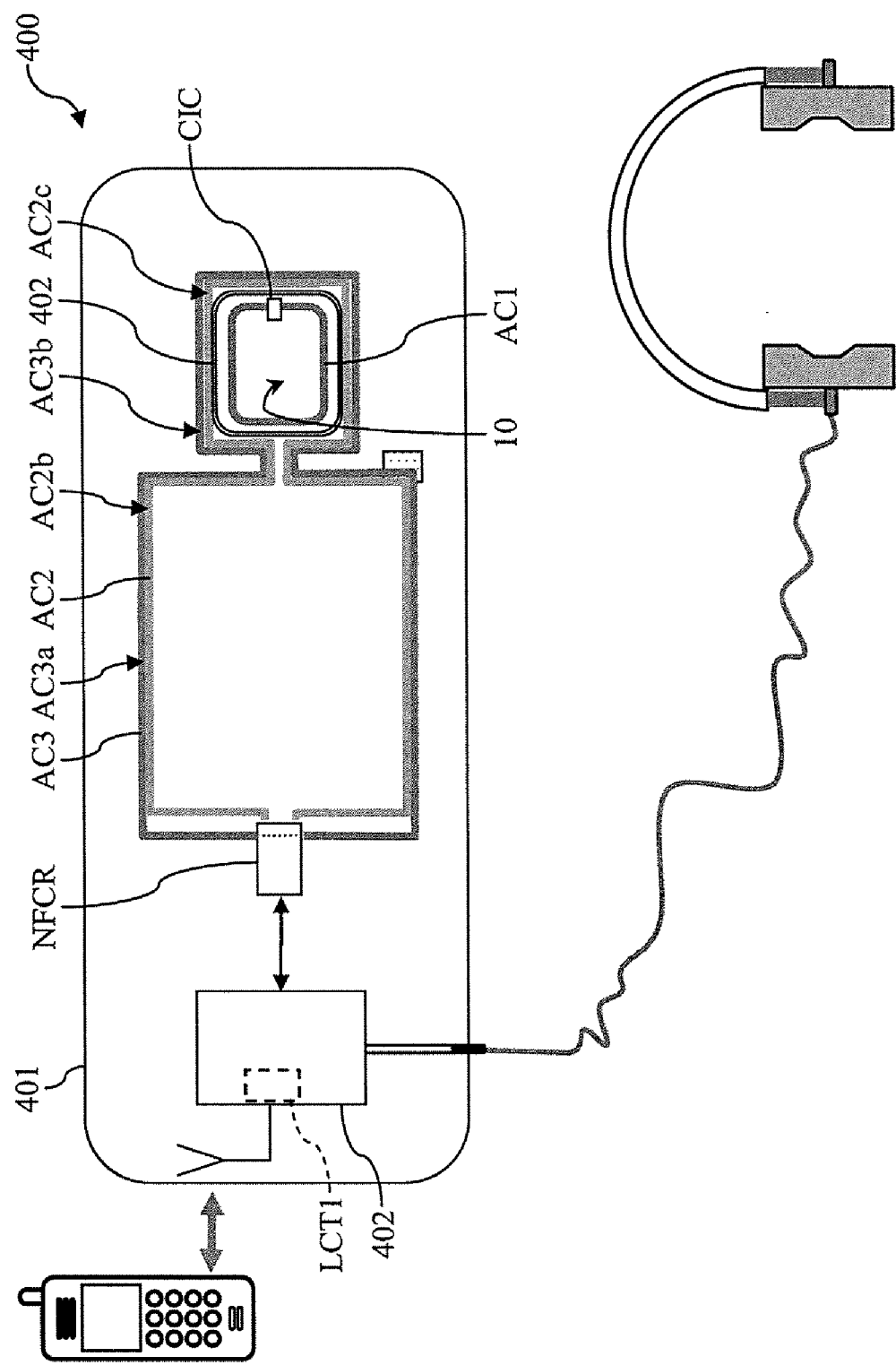
FIG. 26 is a top view of another embodiment of a functional module according to the invention.

FIG. 26 shows a module 400 according to one embodiment of the invention which is integrated in the case 401 of a Bluetooth® earphone used as module support. In the example shown, the component NFCR is directly connected to the audio processor 402 of the earphone, for example by means of an interface UART. The audio processor 402 controls a microphone and an audio transceiver or earpiece (integrated in the earphone or, as shown, taking the shape of a headset connected to the earphone). The audio processor 402 is equipped with a Bluetooth® link circuit LCT1. This link circuit LCT1 is used by the component NFC2 to communicate with a mobile phone to which the earphone is attached, so that it is not necessary to provide a specific link circuit in the component NFCR.

The arrangement of the component NFCR, of the contactless integrated circuit CIC and of the antenna coils AC1, AC2, AC3 is identical to that shown in FIG. 19 (module 206) and will not be described again. Any other previously described arrangement of these elements may also be adopted. In particular the micromodule 10 comprising the contactless integrated circuit CIC may be arranged in a slot housing or a trap housing of the earphone. The component NFCR may also be integrated in the micromodule 20 shown in FIG. 22A and may be inserted into a slot housing equipped with a connector to link it to the audio processor of the earphone.

In the embodiments shown in FIGS. 22A-22C, 23-26 the power supply of the device in which the module is integrated may also be used to electrically power the component NFCR.

Other embodiments of a module according to the invention may use the coil AC2 of the component NFCR to dialog with a phone, without using a Bluetooth® link or other link circuit.

It will be clear to those skilled in the art that a functional module according to the invention is susceptible of various other embodiments. An embodiment may for example comprise two contactless integrated circuits CIC and CIC' (or more), a first contactless integrated circuit CIC being for example dedicated to non secured applications and a contactless integrated circuit CIC' being secured and dedicated to secured applications. Several additional antenna coils may be provided, for example the antenna coil AC3 to increase the communication distance of the contactless integrated circuit CIC, an antenna coil AC4 to increase the communication distance of the component NFCR (in particular in the card emulation mode), an antenna coil AC5 to increase the coupling rate between the antenna coils AC1 and AC2.

Example Uses of a Functional Module

FIGS. 27A, 28A, 29A, 30A, show various applications of the module 100 according to the invention. FIGS. 27B, 28B, 29B, 30B show the same applications using the module 200 equipped' with the antenna coil AC3. The examples of applications using the module 200 are identical to those using the module 100 and simply vary in that the antenna coil AC3 intervenes as passive amplifier element to increase the communication distance when a data transfer with an exterior device EXTD is made.

Figure 27A:
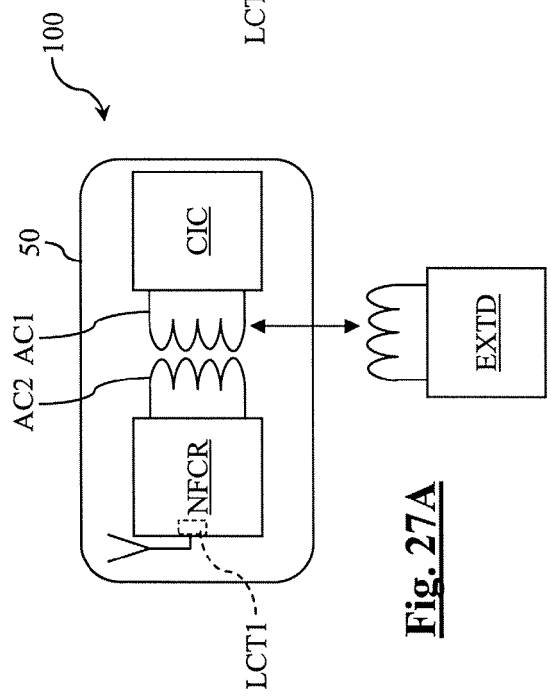
Figure 27B:
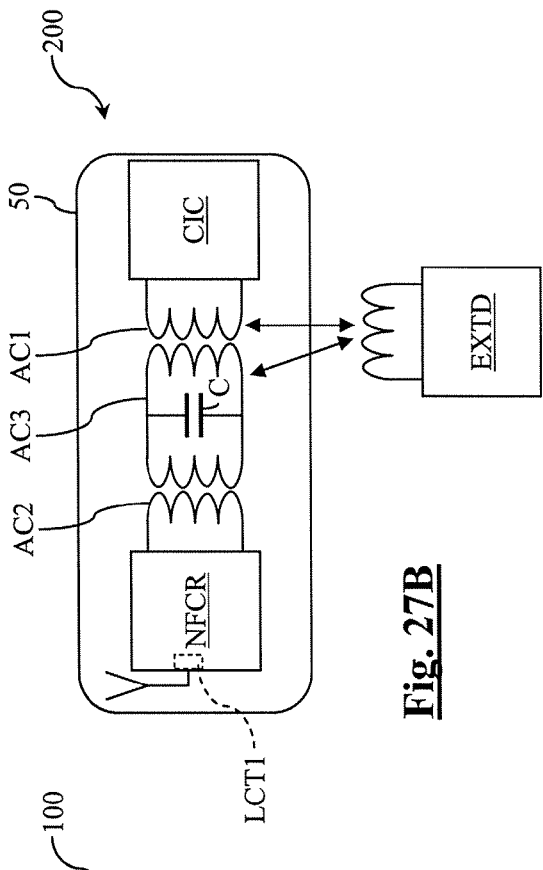

FIGS. 27A, 27B: the memory of the contactless integrated circuit CIC is read or is written by the external device EXTD. The latter may be a RFID reader or a NFC component in the active mode. Examples: secured transaction, payment, data transfer, reading or writing an audio or video file, loading a program, etc. In this operation mode, the module 100 or 200 does not need any supply voltage, the integrated circuit CIC being passive.

Figure 28A:
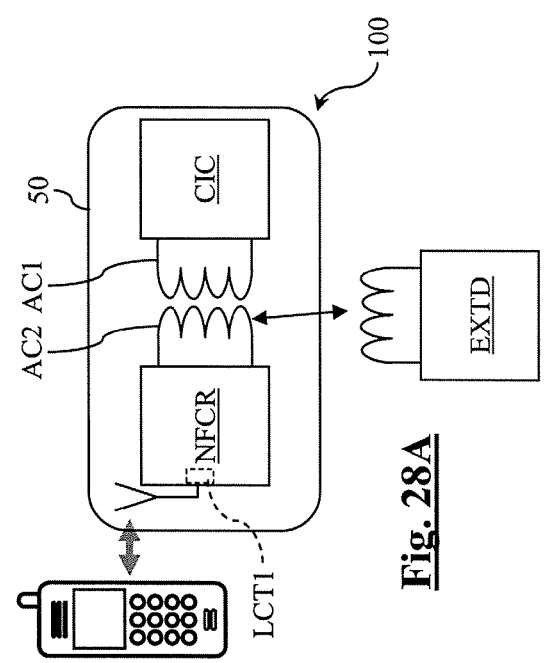
Figure 28B:
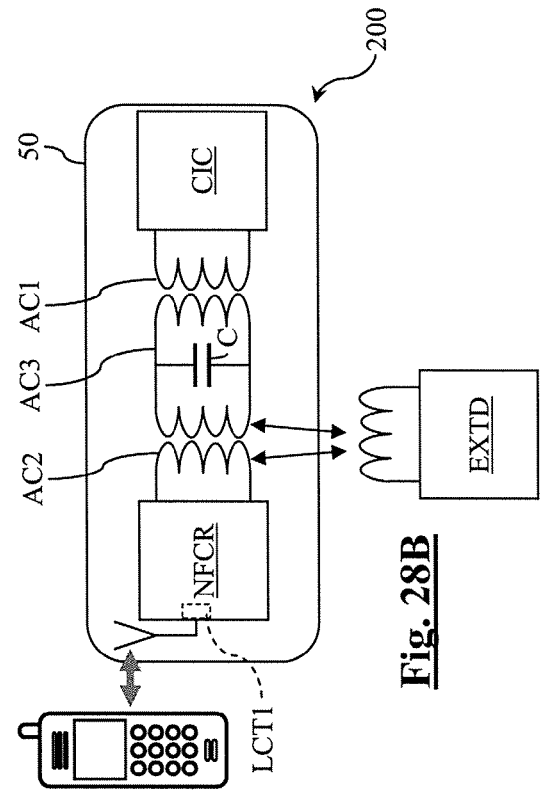

FIGS. 28A, 28B: data are sent by the component NFCR to an external device EXTD or data are sent by the external device EXTD to the component NFCR. If the component NFCR is in the card emulation mode (if this operating mode is provided) the device EXTD may be a RFID reader or a NFC component in the active mode. If the component NFCR is in the active mode, the device EXTD may be an external contactless integrated circuit or an external NFC component being in the emulation mode. In this case, an anti-collision sequence may be carried out to set the integrated circuit CIC aside the communication with the external device and put it in the deselected state. Examples: reading or writing an audio or video file, data transfer, loading a program, etc.

If a data link is simultaneously established between the component NFCR and a mobile phone (or any other master device) via the link circuit LCT1 (the wire link circuit LCT2 described above may also be used), the data received may immediately be transmitted to the phone. The data transmitted to the external device EXTD may likewise be supplied by the phone.

FIGS. 29A, 29B: the memory of the contactless integrated circuit CIC is read or written by the component NFCR, which is in the active mode. Examples: reading data received by the circuit CIC during a transaction as shown in FIGS. 27A, 27B, data or program transfer in the contactless integrated circuit CIC, etc.

FIGS. 30A, 30B: the memory of the contactless integrated circuit CIC is read or written by the component NFCR, which is in the active mode, while a data link is established between the component NFCR and a mobile phone (or any other master device) via the link circuit LCT1 (the wire link circuit LCT2 may also be used). Examples: reading data received by the circuit CIC during a transaction shown in FIGS. 27A, 27B, and transferring these data to the mobile phone, transfer in the contactless integrated circuit CIC of data or programs supplied by the phone, etc.

These examples summarily illustrate the numerous configurations and operating modes that can be implemented by means of a functional module according to the invention. In order to manage these applications, it may be provided to put the module in an operating mode determined by means of commands sent by the master device via the link circuit LCT1 or LCT2. Specific commands in relation with specific actions to be carried out may also be provided. Thus various operating modes of the component NFCR and various types of commands may be provided, for example to cause the component NFCR:

to switch into the active mode, search passive external devices comprising data to be read, read the data then memorize the data read in these devices, to switch into the active mode and search passive external devices comprising transaction programs, then execute the transactions, to switch into the active mode and search passive external devices comprising data to be read, read the data then immediately transfer to the master device the data read in these devices, to switch into the active mode and search passive external devices including audio and/or video data, then transfer them to an audio and/or video processor, to switch into the card emulation mode and answer to active external devices which want to communicate with the component NFCR, to start such or such authorized transaction, to switch into the card emulation mode and answer to active external devices which want to transfer data, then immediately transfer to the master device the data received from these devices, to cyclically read data received by the contactless integrated circuit CIC and memorize them, to cyclically read data received by the contactless integrated circuit CIC and transfer them to the master device, to cyclically read data received by the contactless integrated circuit CIC and immediately transfer them to an audio and/or video processor, to empty the data memory or an application sector of the data memory and transfer it to the master device, to empty the data memory or an application sector of the data memory and write the data concerned into the contactless integrated circuit CIC, to receive data from the master device and write them into the contactless integrated circuit CIC, etc.

From the foregoing it will be appreciated that, although specific embodiments of the invention have been described herein for purposes of illustration, various modifications may be made without deviating from the spirit and scope of the invention. Accordingly, the invention is not limited except as by the appended claims

The invention claimed is:

1. A method for storing and exchanging contactless data, comprising:
   providing at least one Near Field Communication (NFC) passive contactless integrated circuit in the form of a first semi-conductor chip, the passive contactless integrated circuit having a first contactless communication interface comprising a first antenna coil connected to the contactless integrated circuit;
   providing an NFC contactless reader in the form of a second semi-conductor chip, the reader having a second contactless communication interface comprising a second antenna coil connected to the contactless reader;
   providing a link circuit connected to the reader or integrated therein, the link circuit being different from the second contactless interface;
   providing a common portable support;
   gathering the contactless integrated circuit and the reader with the link circuit on or in the common portable support such that the first and second antenna coils are inductively coupled to one another to form an NFC functional module having both passive contactless integrated circuit functionality and reader functionality;
   using the contactless integrated circuit to store data and to exchange data with an external device, through the first contactless communication interface;
   using the reader to store data and to exchange data with an external device through the second contactless communication interface, including performing a sequence to set the contactless integrated circuit aside with respect to the data exchange with the external device;
   causing the contactless integrated circuit and the reader to exchange data through the first and second contactless communication interfaces and through the first and second antenna coils;
   causing the reader to exchange data with a master device via the link circuit, the master device being one of a mobile phone, earphones, PDA, game console, portable audio or video player, or a personal computer; and
   transferring to the master device, via the link circuit, data read in the contactless integrated circuit.

2. A method according to claim 1, comprising providing in the functional module at least one additional antenna coil to perform at least one of the following functions:
   increasing the communication distance of the contactless integrated circuit,
   coupling the antenna coil of the contactless integrated circuit and the antenna coil of the reader, and
   increasing the coupling rate between the antenna coil of the contactless integrated circuit and the antenna coil of the reader.

3. A method according to claim 1, comprising configuring the reader so that it executes:
   a command of reading or writing the contactless integrated circuit,
   a command of reading or writing an external device,
   a command of transferring to the master device, via the link circuit, data read in the contactless integrated circuit, and
   a command of transferring to the master device, via the link circuit, data read in the external device.

4. A method according to claim 1, comprising providing in the functional module a Bluetooth® interface circuit as the link circuit.

5. A method according to claim 1, comprising providing in the functional module a contact connector as the link circuit.

6. A method according to claim 1, comprising mounting at least one of the reader or the contactless integrated circuit on or in the portable support by means of an intermediate support.

7. A method according to claim 1, comprising integrating the functional module in an earphone of a mobile phone, linking the reader to a processor of the earphone, and transmitting to the processor data received by the reader or the contactless integrated circuit by inductive coupling.

8. A method according to claim 1, comprising providing in the functional module an electric power supply to energize the reader, the electric power supply including an electric battery or a capacitor electrically charged by a remote power feeding circuit.

9. A method according to claim 1, comprising providing in the functional module an NFC reader comprising a reader operating mode and an emulation operating mode wherein the reader emulates the operation of a contactless integrated circuit.

10. A method according to claim 1, comprising providing in the contactless integrated circuit an encryption circuit to perform secured transactions comprising a step of authentication of the contactless integrated circuit.

11. A method according to claim 1 comprising:
associating the functional module with a master device,
writing data into the contactless integrated circuit, by inductive coupling, by means of an external device, and energizing the contactless integrated circuit from a magnetic field supplied by the external device,
reading the data written in the contactless integrated circuit by means of the reader, and energizing the contactless integrated circuit from a magnetic field supplied by the reader, and
transferring to the master device, via the link circuit, the data read in the contactless integrated circuit.

12. A method according to claim 1, comprising:
associating the functional module with a master device,
sending data to the reader by means of the master device, via the link circuit,
writing the data in the contactless integrated circuit by means of the reader, and energizing the contactless integrated circuit from a magnetic field supplied by the reader, and
reading the data written in the contactless integrated circuit by means of an external device different from the master device, energizing the contactless integrated circuit from a magnetic field supplied by the external device, and memorizing the data in the external device.

13. A method according to claim 1, comprising:
integrating the functional module into a portable device forming a peripheral accessory of mobile phone, the portable device including a processor and the link circuit,
reading by inductive coupling an audio or video file by means of the reader, and
transferring the audio or video file to the processor of the portable device.

14. A method according to claim 13, wherein the audio or video file is read in the contactless integrated circuit.

15. A method according to claim 14, comprising writing in the contactless integrated circuit the audio or video file, by inductive coupling and by means of an external device, before reading the audio or video file by means of the reader.

16. A method according to claim 15, wherein the external device is a contactless integrated circuit reader or a Near Field Communication (NFC) component.

17. A method according to claim 15, wherein the external device is a contactless integrated circuit reader, and comprising switching the reader in a contactless integrated circuit emulation mode to receive the data from the external device.

18. A method according to claim 1, comprising:
when the contactless integrated circuit exchanges data with an external device, energizing the contactless integrated circuit from a magnetic field supplied by the external device, and
when the contactless integrated circuit exchanges data with the reader, energizing the contactless integrated circuit from a magnetic field supplied by the reader.

19. A Near Field Communication functional module, having both passive contactless integrated circuit functionality and reader functionality, for storing and exchanging data, comprising:
a common portable support,
at least one passive contactless integrated circuit in the form of a first semi-conductor chip, the passive contactless integrated circuit having a first contactless communication interface comprising a first antenna coil connected to the contactless integrated circuit,
a contactless integrated circuit reader in the form of a second semi-conductor chip, the reader having a second contactless communication interface comprising a second antenna coil connected to the contactless reader,
a link circuit connected to the reader or integrated therein, the link circuit being different from the second contactless interface, and wherein
the contactless integrated circuit and the reader with the link circuit are gathered on or in the common portable support such that the first and second antenna coils are inductively coupled to one another,
the reader is configured to store data and to exchange data through the second contactless communication interface with an external device after having performed a sequence to set the contactless integrated circuit aside with respect to the data exchange with the external device,
the contactless integrated circuit is configured to exchange data with an external device through the first contactless communication interface,
the contactless integrated circuit and the reader are also configured to exchange data through the first and second contactless communication interfaces and through the first and second antenna coils, and
the reader is configured to exchange data with a master device via the link circuit, the master device being one of a mobile phone, earphones, PDA, game console, portable audio or video player, or a personal computer, and to transfer to the master device, via the link circuit, data read in the contactless integrated circuit of the functional module.

20. A module according to claim 19, comprising an additional antenna coil ensuring at least one of the following functions:
increasing the communication distance of the contactless integrated circuit,
coupling the antenna coil of the contactless integrated circuit and the antenna coil of the reader, and
increasing the coupling rate between the antenna coil of the contactless integrated circuit and the antenna coil of the reader.

21. A module according to claim 19, wherein the reader is configured to receive via the link circuit and to execute:
a command of reading or writing the contactless integrated circuit,
a command of reading or writing an external device by inductive coupling,
a command of transferring via the link circuit data read in the contactless integrated circuit, and
a command of transferring via the link circuit data read in the external device.

22. A module according to claim 19, wherein the link circuit comprises a Bluetooth® interface circuit.

23. A module according to claim 19, wherein the link circuit comprises a contact connector.

24. A module according to claim 19, wherein at least one of the reader and the contactless integrated circuit is mounted on or in the portable support by means of an intermediate support.

25. A module according to claim 19, comprising an electrical power supply to energize the reader, the electric power supply including an electric battery or a capacitor electrically charged by a remote power feeding circuit.

26. A module according to claim 19, wherein the reader is a Near Field Communication (NFC) component comprising an operating mode in which the NFC component emulates the operation of a contactless integrated circuit and may dialog with another reader.

27. A module according to claim 19, wherein the contactless integrated circuit is a secured circuit comprising an encryption circuit to make secured transactions comprising a step of authentication of the contactless integrated circuit.

28. An earphone of a mobile phone comprising a functional module according to claim 19, the reader being linked to a processor of the earphone and configured to transfer to the processor data received by inductive coupling by the reader or by the contactless integrated circuit.

29. A mobile phone comprising a functional module according to claim 19, the reader being linked to a processor of the mobile phone and configured to transfer to the processor data received by inductive coupling by the reader or by the contactless integrated circuit.

30. A module according to claim 19, wherein:
the contactless integrated circuit includes a power supply circuit configured to energize the contactless integrated circuit from a magnetic field received by the first contactless interface,
the contactless integrated circuit is energized by a magnetic field supplied by the external device when it exchanges data with an external device, and
the contactless integrated circuit is energized by a magnetic field supplied by the reader when it exchanges data with the reader.

31. A system for storing and exchanging data and having both passive contactless integrated circuit functionality and reader functionality, comprising:
a Near Field Communications (NFC) functional module, comprising:
 a common portable support,
 at least one passive contactless integrated circuit in the form of a first semi-conductor chip, the passive contactless integrated circuit having a first contactless communication interface comprising a first antenna coil connected to the contactless integrated circuit and a power supply circuit configured to energize the contactless integrated circuit from a magnetic field received by the first contactless communication interface,
 a contactless integrated circuit reader in the form of a second semi-conductor chip, the reader having a second contactless communication interface comprising a second antenna coil connected to the contactless reader,
 the contactless integrated circuit and the reader being gathered on or in the common portable support such that the first and second antenna coils are inductively coupled to one another to form the NFC functional module, and a link circuit connected thereto or integrated therein, the link circuit being different from the second contactless interface,
a master device linked to the reader by means of the link circuit, wherein:
the reader is configured to store data and to exchange data through the second contactless communication interface with an external device after having performed a sequence to set the contactless integrated circuit aside with respect to the data exchange with the external device, or with the contactless integrated circuit, and to exchange data with the master device through the link circuit,
the contactless integrated circuit is configured to exchange data with an external device through the first contactless communication interface,
the contactless integrated circuit and the reader are configured to exchange data through the first and second contactless communication interfaces and through the first and second antenna coils,
the master device is configured to read data in the contactless integrated circuit through the reader and the data link circuit,
the contactless integrated circuit is energized by a magnetic field supplied by the external device when it exchanges data with an external device, and
the contactless integrated circuit is energized by a magnetic field supplied by the reader when it exchanges data with the reader.

32. A system according to claim 31, wherein the reader is configured to execute the following commands, sent by the master device:
a command of reading or writing the contactless integrated circuit,
a command of reading or writing an external device different from the master device,
a command of transferring to the master device data read in the contactless integrated circuit, and
a command of transferring to the master device data read in the external device.

33. A system according to claim 31, wherein the link circuit comprises a Bluetooth® interface circuit.

34. A system according to claim 31, wherein the link circuit comprises a contact connector.

\* \* \* \* \*